United States Patent
Gundavelli et al.

(10) Patent No.: US 11,540,109 B2
(45) Date of Patent: *Dec. 27, 2022

(54) TECHNIQUES FOR DECOUPLING AUTHENTICATION AND SUBSCRIPTION MANAGEMENT FROM A HOME SUBSCRIBER SERVER

(71) Applicant: Cisco Technology, Inc., San Jose, CA (US)

(72) Inventors: Srinath Gundavelli, San Jose, CA (US); Sangram Kishore Lakkaraju, Bangalore (IN); Mark Grayson, Berkshire (GB); Louis Gwyn Samuel, Wiltshire (GB); Timothy Peter Stammers, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,399

(22) Filed: Jun. 9, 2020

(65) Prior Publication Data
US 2021/0185506 A1 Jun. 17, 2021

Related U.S. Application Data

(63) Continuation of application No. 16/715,669, filed on Dec. 16, 2019, now Pat. No. 10,750,350.

(51) Int. Cl.
*H04W 8/04* (2009.01)
*H04W 8/18* (2009.01)
(Continued)

(52) U.S. Cl.
CPC ............. *H04W 8/04* (2013.01); *H04W 8/18* (2013.01); *H04W 8/26* (2013.01); *H04W 12/043* (2021.01);
(Continued)

(58) Field of Classification Search
CPC ......... H04W 4/38; H04W 4/029; H04W 4/02; H04W 4/023; H04W 4/80; H04W 84/12;
(Continued)

(56) References Cited

U.S. PATENT DOCUMENTS

| 9,148,776 B1* | 9/2015 | Schroeder | H04W 8/087 |
| 2017/0094512 A1* | 3/2017 | Kiss | H04L 63/0853 |

(Continued)

FOREIGN PATENT DOCUMENTS

| KR | 20160125516 A | 10/2016 |
| WO | 2016196958 A1 | 12/2016 |
| WO | 2021017669 A1 | 2/2021 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.3.0, Jun. 2019, 423 pages.

(Continued)

*Primary Examiner* — Kwasi Karikari
(74) *Attorney, Agent, or Firm* — Edell, Shapiro & Finnan, LLC

(57) ABSTRACT

Techniques are described to provide for authentication and subscription management that are decoupled from a Home Subscriber Server (HSS). In one example, a method includes providing a device profile at an authentication function, wherein the device profile comprises identification information for a device for a plurality of access types including a first identifier for the device associated with a cellular access and a second identifier for the device associated with a wireless local area network access; obtaining an access request message associated with the device for the cellular access, wherein the access request message comprises the first identifier and an authentication attribute; generating (Continued)

authentication information for authenticating the device for the cellular access based, at least in part, on the authentication attribute; and generating, for transmission, an access accept message for the cellular access, wherein the access accept message comprises the first identifier, the second identifier, and the authentication information.

20 Claims, 12 Drawing Sheets

(51) Int. Cl.
| | |
|---|---|
| *H04W 8/26* | (2009.01) |
| *H04W 12/06* | (2021.01) |
| *H04W 12/043* | (2021.01) |
| *H04W 92/24* | (2009.01) |
| *H04W 88/06* | (2009.01) |

(52) U.S. Cl.
CPC ............ *H04W 12/06* (2013.01); *H04W 88/06* (2013.01); *H04W 92/24* (2013.01)

(58) Field of Classification Search
CPC ....... H04W 84/18; H04W 64/00; H04W 4/14; H04W 8/005; H04W 24/10; H04W 40/246; H04W 40/248; H04W 4/027; H04W 52/0209; H04W 56/0015; H04W 64/003; H04W 88/02; H04W 12/009; H04W 28/0226; H04W 28/0231; H04W 40/20; H04W 4/025; H04W 56/00
See application file for complete search history.

(56) References Cited

U.S. PATENT DOCUMENTS

| | | | |
|---|---|---|---|
| 2018/0092147 A1 | 3/2018 | Pelletier et al. | |
| 2018/0227871 A1* | 8/2018 | Singh .................. | H04W 12/068 |
| 2019/0149990 A1 | 5/2019 | Wang et al. | |
| 2020/0366677 A1 | 11/2020 | Draznin et al. | |
| 2021/0045193 A1 | 2/2021 | Mishra et al. | |

OTHER PUBLICATIONS

3GPP, "3rd Generation Partnership Project; Technical Specification Group Services and System Aspects; System Architecture for the 5G System; Stage 2 (Release 15)", 3GPP TS 23.501 V15.3.0, Sep. 2018, 226 pages.
3GPP, "3rd Generation Partnership Project; Technical Specification Group Services and System Aspects; 3G security; Access security for IP-based services (Release 15)", 3GPP TS 33.203 V15.1.0, Mar. 2018, 145 pages.
3GPP, "3rd Generation Partnership Project; Technical Specification Group Services and System Aspects; 3G Security; Security architecture (Release 15)", 3GPP TS 33.102 V15.1.0, Dec. 2018, 77 pages.
3GPP, "3rd Generation Partnership Project; Technical Specification Group Core Network and Terminals; Evolved Packet System (EPS); 3GPP EPS AAA interfaces (Release 15)", 3GPP TS 29.273 V15.3.0, Mar. 2019, 199 pages.
3GPP, "3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15)", 3GPP TS 29.272 V15.8.0, Jun. 2019, 179 pages.
J. Arkko et al., "Improved Extensible Authentication Protocol Method for 3rd Generation Authentication and Key Agreement (EAP-AKA')", Network Working Group, Request for Comments: 5448, May 2009, 29 pages.
P. Calhoun, ED. et al., "Control and Provisioning of Wireless Access Points (CAPWAP) Protocol Specification", Network Working Group, Request for Comments: 5415, Mar. 2009, 155 pages.
B. Aboba et al., "The Network Access Identifier", Network Working Group, Request for Comments: 4282, Dec. 2005, 16 pages.
J. Arkko et al., "Extensible Authentication Protocol Method for 3rd Generation Authentication and Key Agreement (EAP-AKA)", Network Working Group, Request for Comments: 4187, Jan. 2006, 79 pages.
Wikipedia, "QoS Class Identifier", https://en.wikipedia.org/wiki/QoS_Class_Identifier, Jul. 22, 2019, 3 pages.
Mpirical, "KASME—Key Access Security", https://www.mpirical.com/glossary/kasme-key-access-security-management-entries, downloaded Dec. 4, 2019, 3 pages.
Hewlett Packard Enterprise Development LP., "From Subscriber Data Management to shared data environment", SDM in 5G architecture, a00035556ENW, Nov. 2017, 8 pages.
Samsung Electronics Co., Ltd., "5G Core Vision", Samsung 5G Core vol. 1, downloaded Apr. 6, 2020, 16 pages.
Nanjing ZTE software Co. Ltd., "ZTE Probes into the User Data 5G Evolution Solution", https://sdnfv.zte.com.cn/en/insights/2019/9/ZTE-Probes-into-the-User-Data-5G-Evolution-Solution, Sep. 29, 2019, 6 pages.
Nanjing ZTE software Co. Ltd., "ZTE Authentication Solution Builds a Secure 5G Network", https://sdnfv.zte.com.cn/en/insights/2019/6/ZTE-Authentication-Solution-Builds-a-Secure-5G-Network, Jun. 17, 2019, 8 pages.
VMware, Inc., "vCloud NFV OpenStack Edition Reference Architecture 3.3", downloaded Apr. 6, 2020, 88 pages.
SK Telecom Co., Ltd., "SK Telecom Continues to Arm its 5G Network with Quantum Cryptography Technologies", https://www.sktelecom.com/en/press/press_detail.do?page.page=1&idx=1385&page.type=all&page.keyword=, Mar. 18, 2019, 2 pages.
Huawei Technologies Co., Ltd., "Partnering with the Industry for 5G Security Assurance", downloaded Apr. 6, 2020, 22 pages.
Varnai, Zoltan et al., "Beefing up security in a 5G world", https://www.nokia.com/blog/beefing-security-5g-world/, Aug. 15, 2019, 6 pages.
C. Rigney et al., "Remote Authentication Dial In User Service (RADIUS)", Network Working Group, RFC 2865, The Internet Society (2000), Jun. 2000, 76 pages.
B. Aboba, et al., "RADIUS (Remote Authentication Dial In User Service) Support for Extensible Authentication Protocol (EAP)," Network Working Group, Request for Comments: 3579, Updates: 2869, Category: Informational, Sep. 2003, 46 pages.
ETSI, "Digital cellular telecommunications system (Phase 2+) (GSM); Universal Mobile Telecommunications System (UMTS); LTE; 3GPP System Architecture Evolution (SAE); Security aspects of non-3GPP accesses (3GPP TS 33.402 version 15.1.0 Release 15)", ETSI TS 133 402 V15.1.0 (Jul. 2018), 71 pages.
International Search Report and Written Opinion in counterpart International Application No. PCT/US2020/063924, dated Mar. 29, 2021, 15 pages.

\* cited by examiner

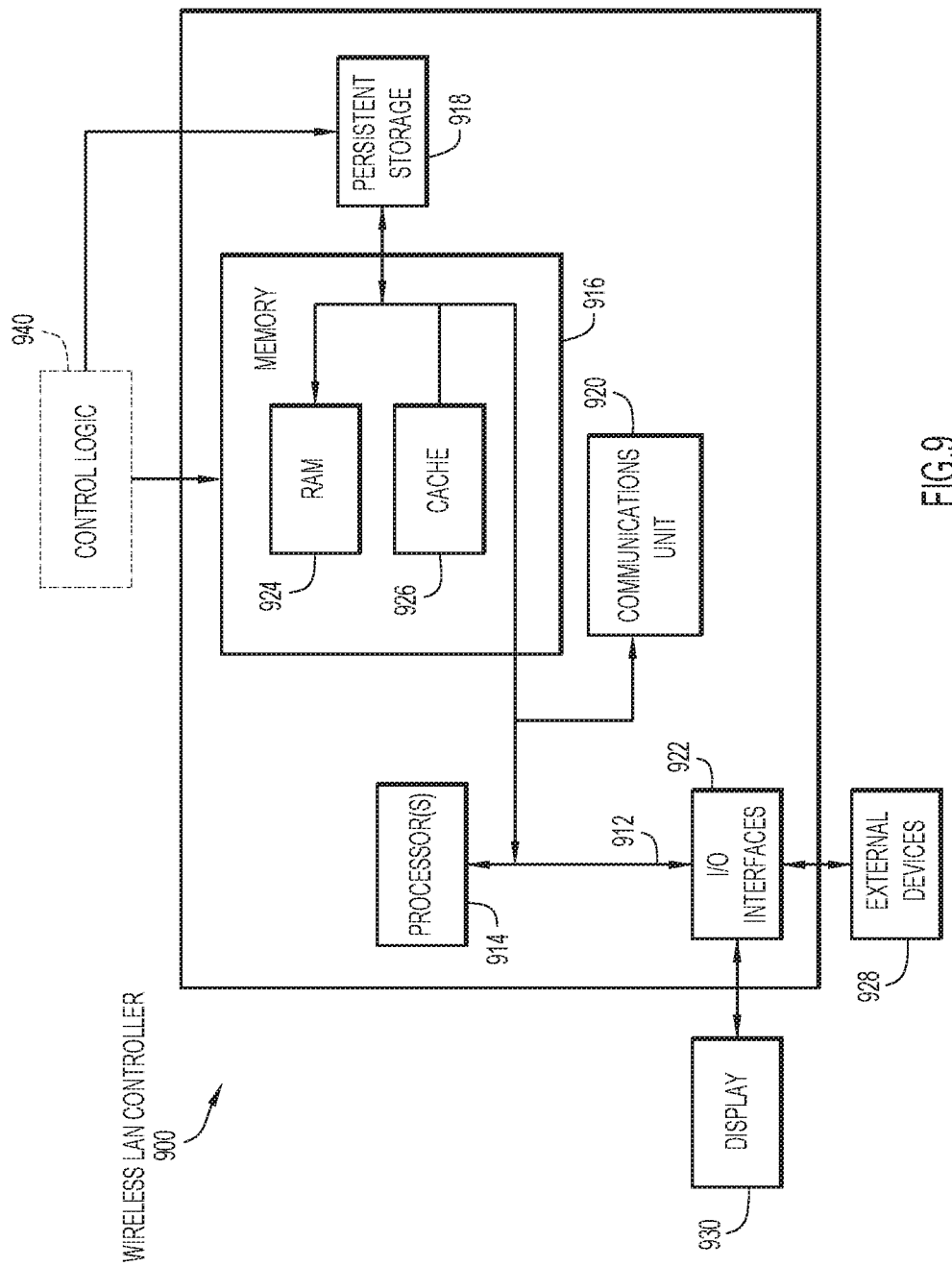

TECHNIQUES FOR DECOUPLING AUTHENTICATION AND SUBSCRIPTION MANAGEMENT FROM A HOME SUBSCRIBER SERVER

CROSS-REFERENCE TO RELATED APPLICATION

This application is a continuation of and claims benefit to U.S. patent application Ser. No. 16/715,669, filed Dec. 16, 2019, the entire contents of which are incorporated herein by reference.

TECHNICAL FIELD

The present disclosure relates to network equipment and services.

BACKGROUND

Networking architectures have grown increasingly complex in communications environments, particularly mobile networking environments. Mobile communication networks have grown substantially as end users have become increasingly connected to mobile network environments. As the number of mobile users increases, efficient management of communication resources becomes more critical. In particular, there are significant challenges in managing network authentication and subscription management for architectures involving multiple access types.

BRIEF DESCRIPTION OF THE DRAWINGS

FIG. 9 is a hardware block diagram of a wireless local area network controller that may participate in authentication and subscription management operations according to an example embodiment.

DESCRIPTION OF EXAMPLE EMBODIMENTS

Overview

Figure 1:
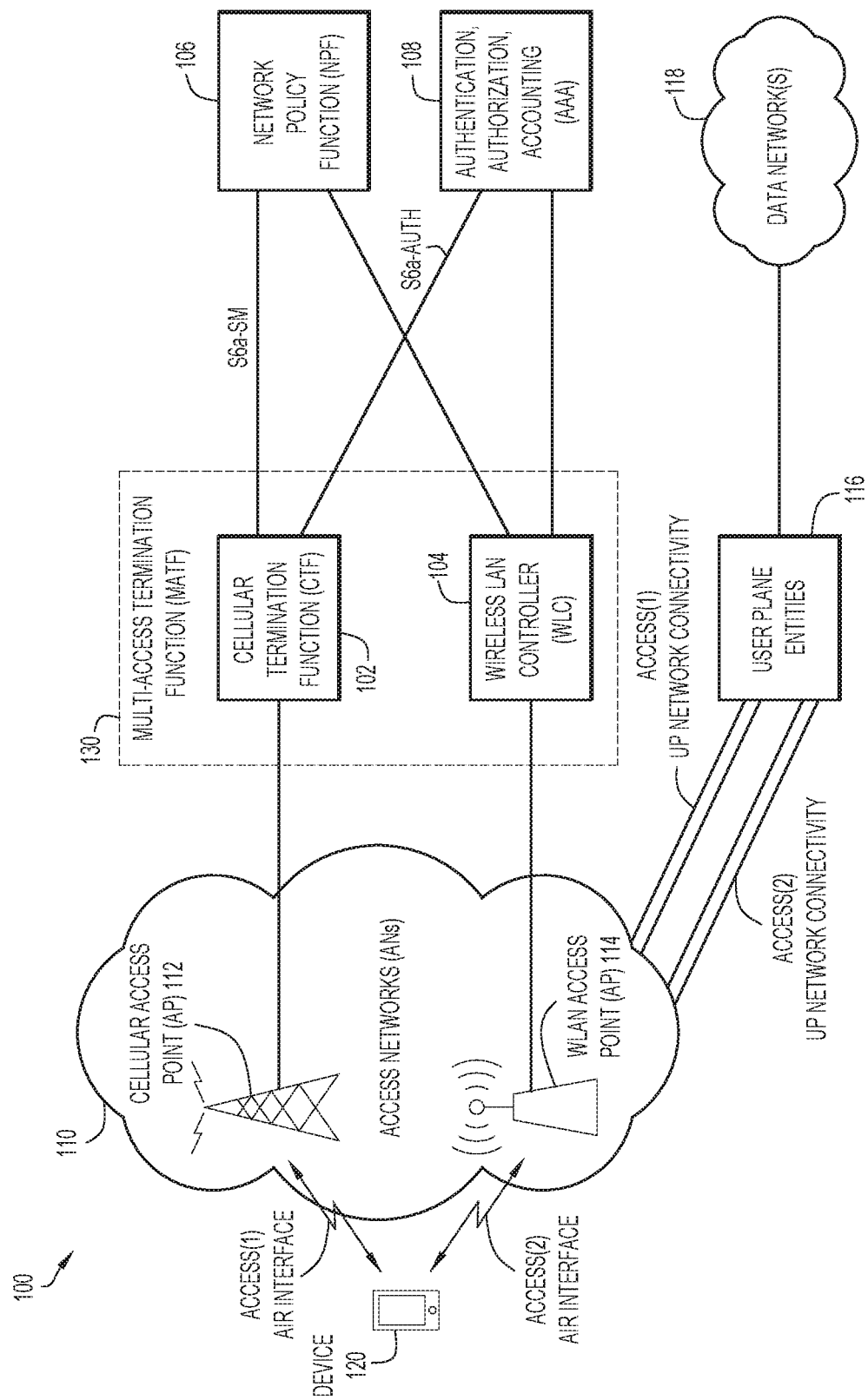
FIG. 1 is block a diagram of a system in which techniques that provide for authentication and subscription management for multiple accesses that is decoupled from a Home Subscriber Server (HSS) may be implemented, according to an example embodiment.

Techniques presented herein define an approach for unifying authentication and policy functions across wired, wireless local area network (e.g., Wi-Fi®) and private cellular (e.g., private 3rd Generation Partnership Project (3GPP) 4th Generation (4G)/Long Term Evolution (LTE), 5th Generation (5G), etc.) access technologies by decoupling the authentication and policy management functionality from a 3GPP Home Subscriber Server (HSS) and merging such functionality with the an authentication, authorization, and accounting function (AAA) and a network policy function (NPF) that can be used for multi-access (e.g., wired, wireless local area network (WLAN), cellular, etc.) access management. In at least one embodiment, techniques presented herein may be realized or otherwise implemented by splitting a 3GPP S6a interface into an S6a Authentication (S6a-Auth) interface and an S6a subscription management (S6a-SM) and moving the interfaces out of an HSS and into the AAA (for the S6a-Auth interface) and the NPF (for the S6a-SM interface).

Techniques presented herein may allow an enterprise deploying multi-access technologies to eliminate the need for a 3GPP HSS that is typically involved with private cellular access management. Furthermore, techniques presented herein provide for the use of a unified user or device profile that provides for mapping access specific identities to a common user or device identity such that an enterprise deploying multi-access technologies such as wired, WLAN, and private cellular can correlate user or device sessions across wired, WLAN, and private cellular access connections.

In an example embodiment, a method is provided that includes configuring a device (e.g., a user equipment (UE)) profile at an authentication function, wherein the device profile comprises identification information for a device for a plurality of access types and the identification information comprises a first identifier for the device that is associated with a cellular access and a second identifier for the device that is associated with a wireless local area network access; obtaining an access request message associated with the device connecting to the cellular access, wherein the access request message comprises the first identifier for the device and an authentication attribute; generating authentication information for authenticating the device for the cellular access based, at least in part, on identifying the authentication attribute within the access request message; and generating, for transmission, an access accept message for the cellular access, wherein the access accept message comprises the first identifier for the device, the second identifier for the device, and the authentication information.

In at least one implementation, the access accept message is a Remote Authentication Dial-In User Service (RADIUS) access accept message that is transmitted to a function associated with the cellular access. In at least one implementation, the method may further include requesting, by the function, policy information for the device from a policy function based on the second identifier for the device that is associated with a wireless local area network access, wherein the policy function and the authentication function are separate functions; obtaining, by the function, the policy information for the device from the policy function; and updating, by the function, session information for the device based on the policy information. In at least one implementation, the function interfaces with the policy function using an S6a subscription management (S6a-SM) interface and the function interfaces with the authentication function using an S6a authentication (S6a-Auth) interface. In various implementations, the function may be at least one of a cellular termination function, a 3GPP Mobility Management Entity, and/or a 3GPP Access and Mobility Management Function.

In at least one implementation, the method may further include determining a session event for the device in which the device is connected to a first access type and the session event is associated with a second access type; and communicating a message to a function associated the second access type for which the session event has occurred, wherein the message comprises context information for the device associated with the second access type for which the session event has occurred.

Example Embodiments

In 3rd Generation Partnership Project (3GPP) architecture, such as a 4th Generation (4G) Evolved Packet System (EPS) architecture as generally defined by 3GPP Technical Specification (TS) 23.401, among others, a user equipment (UE), mobile device or, more generally, a device connects to an Evolved Packet Core (EPC) over an Evolved Universal Mobile Telecommunications System (UMTS) Terrestrial Radio Access Network (E-UTRAN). In such a conventional 3GPP architecture, a Mobility Management Entity (MME) uses an S6a interface to communication with a Home Subscriber Server (HSS) for user authentication and subscription management operations. Typically, the HSS has the database that contains both user and subscription related information and tightly couples both authentication and subscription functions into a single function in which the single function is exposed to other network functions through the 3GPP-defined S6a interface.

For current enterprise deployments that include private 3GPP cellular access(es) (e.g., private 4G/Long Term Evolution (LTE) access, 5G access, combinations thereof, and/or the like) an enterprise has to support the 3GPP-defined S6a interface and also provide a HSS node for user authentication and policy control. However, to manage wired and wireless local area network (WLAN) authentication, the same enterprise may also need to support at least one other authentication function for managing wired and wireless local area network access authentication (such as the Cisco® Identity Services Engine (ISE), an authentication, authorization, and accounting (AAA) function, or the like), as well as at least one other another policy management function to facilitate user policy management (such as the Cisco® Digital Network Architecture Center (DNAC) Access Control Application (ACA) or the like). Cisco is a registered trademark of Cisco Technology, Inc.

Thus, current enterprise deployments involving multiple accesses essentially result in: 1) enterprises needing to manage multiple authentication (Auth) functions (e.g., HSS (for 4G/LTE Auth) and AAA (for Wi-Fi Auth)) and multiple policy functions (e.g., HSS and ACA); 2) enterprises needing to manage multiple user profiles for the same user or device (for each access) in all of these different nodes; and 3) enterprises needing to touch all of these elements for on-boarding and off-boarding users or devices. This also results in enterprises having no easy ways to correlate a given user or device's WLAN and private cellular sessions and information pertaining thereto, as there is currently no mechanism to map access specific authenticated identities to a common access independent identity.

Presented herein are techniques that provide for decoupling authentication and subscription management functions from a conventional 3GPP HSS and leverage or extend functions used for WLAN and wired access authentication to additionally provide for cellular access authentication. Additionally, techniques presented herein provide for splitting S6a interface into an S6a-Auth (Authentication) interface and an S6a-SM (subscription management) interface. These decoupled interfaces may be terminated on different network nodes.

For example, in some implementations a unified authentication, authorization, and accounting function (AAA) such as Cisco® ISE that is typically used for Wi-Fi (WLAN) and wired accesses can be extended to terminate the new S6a-Auth interface (e.g., to facilitate Evolved Packet System Authentication and Key Agreement (EPS-AKA) user/device authentication mechanisms over Remote Authentication Dial-In User Service (RADIUS)) for supporting private cellular access authentication without the need for a 3GPP HSS. Similarly, the S6a-SM interface can be terminated on a unified network subscription management function or, more generally, a unified network policy function (NPF) such as Cisco® DNAC ACA or the like used for Wi-Fi and wired user/device policy management that can be extended to provide policy support for cellular accesses, thereby eliminating the need for a 3GPP HSS.

Further, techniques presented herein may allow enterprise functions such as the AAA to correlate user/device access sessions by mapping access specific identities for the user/device (also referred to herein as identifiers, identification information, and variations thereof) to a common (enterprise) identity and manage access sessions for the user/device under a single user/device profile. Per-user/device access specific identities/identifiers, authentication type attributes (e.g., authentication type, sub-type, etc.), and authentication attributes (e.g., credentials, passwords, keys, etc.) may be configured within a converged access profile associated with multiple accesses to which a particular user/device can connect. In various implementations, a converged access profile for a particular user/device can be configured as a combined profile for multiple accesses or can be configured within separate profiles in which each profile for the particular user/device can be correlated to the particular user/device based on user/device access specific identities/identifiers configured for each access.

Referring to FIG. 1, FIG. 1 is a block diagram of a system 100 in which techniques that provide for authentication and subscription management for multiple accesses that is decoupled from a Home Subscriber Server (HSS) may be implemented, according to an example embodiment. In at least one implementation, the system 100 may include a cellular termination function (CTF) 102, a wireless LAN controller (WLC) 104, an network policy function (NPF), a authentication, authorization, and accounting function (AAA) 108, and access networks (ANs) 110, including a cellular access point (AP) 112 and a WLAN access point (AP) 114. System 100 may also include one or more user plane entities 116 and one or more data network(s) 118. Also shown in system 100 is a user equipment (UE) or device 120.

For various examples described herein, various information/data associated with services, security, quality, etc. provided/enforced for device 120 may be discussed interchangeably using the term 'policy' (e.g., enterprise policy, etc.). Generally, as referred to herein, a 'policy' can represent a collection of intent or goals, sometimes characterized as 'rules' (e.g., access type/location/etc. authorization rules, Quality of Service (QoS) rules, QoS Class Identifier (QCI), security rules, etc.), through which application of the policy (e.g., rules of the policy) can be utilized to realize the intent or goals of the policy.

As referred to herein, the terms 'access', 'access type', and variations thereof that may be used with reference to access networks 110 may refer to wired accesses/access types (e.g., Ethernet) and wireless or over-the-air Radio Frequency (RF) accesses/access types (e.g., also sometimes referred to as Radio Access Technology (RAT) types such as, but not limited to: non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; cellular accesses such as 3GPP licensed spectrum accesses (e.g., 3rd Generation (3G), 4G/LTE, 5G, and/or next Generation (nG) accesses) and/or 3GPP unlicensed spectrum accesses (e.g., Licensed-Assisted Access (LAA), enhanced LAA (eLAA), further enhanced LAA (feLAA), and New Radio Unlicensed (NR-U)); Citizen Broadband Radio Service (CBRS) accesses; combinations thereof; and/or the like.

Further as referred to herein, the term 'cellular' may refer to any licensed spectrum access type (e.g., 3GPP-based, CBRS-based, etc.). Additionally, the terms 'WLAN' (wireless local area network) and 'Wi-Fi®' may be used interchangeably; however, the term 'WLAN' may also be inclusive of any other unlicensed spectrum access type (e.g., IEEE 802-based access types, NFC, Bluetooth®, etc.). Accordingly, although techniques described herein are discussed with reference to cellular and WLAN accesses/access types, discussions of these particular accesses are not meant to limit the broad scope of the present disclosure. Techniques described herein may be implemented for virtually any combination or number of wired and/or non-wired/air interface (e.g., cellular, WLAN, etc.) accesses/access types and, thus, are clearly within the scope of the present disclosure.

For the embodiment of FIG. 1, cellular AP 112 may interface with CTF 102. CTF 102 may further interface with NPF 106 using a new S6a-SM (subscription management) interface. CTF 102 may further interface with AAA 108 using a new S6a-Auth (authentication) interface. Further, WLAN AP 114 may interface with WLC 104. WLC 104 may further interface with NPF 106 and also with AAA 108.

In general, cellular AP 112 may be configured with appropriate hardware (e.g., processor(s), memory element(s), antennas and/or antenna arrays, baseband processors (modems), and/or the like), software, logic, and/or the like to provide over-the-air coverage for a private cellular access network (e.g., private 4G/LTE, private 5G, private CBRS, etc.). By 'private' it is meant that a private cellular access network provides network connectivity/services to users/devices/etc., served by a network operator and/or service provider of the private cellular access network, such as an enterprise. In one example, a private cellular access network may be considered to be a network that may be implemented to serve enterprise purposes (e.g., business purposes, government purposes, educational purposes, etc.) for enterprise clients (e.g., enterprise users/devices/etc.) in which the private cellular access network may be operated by any combination of traditional mobile network operators/service providers (e.g., AT&T®, Verizon®, etc.), enterprises network operators/service providers (e.g., Cisco®, etc.), and/or third party network operators/service providers (e.g., neutral host network operators/service providers, cloud service providers, etc.).

In various embodiments, cellular AP 112 may be implemented as any combination of an evolved Node B (eNB or eNodeB) to facilitate 4G/LTE air accesses, a next generation Node B (gNB) to facilitate 5G air accesses, a next generation (nG) radio to facilitate any next Generation air accesses, a CBRS device (CBSD) to facilitate CBRS accesses, and/or the like now known here or hereafter developed.

In general, WLAN AP 114 may be configured with appropriate hardware (e.g., processor(s), memory element(s), antennas and/or antenna arrays, baseband processors (modems), and/or the like), software, logic, and/or the like to provide over-the-air coverage for a WLAN access network (e.g., Wi-Fi®, etc.). In various embodiments, WLAN AP 114 may be implemented as a Wi-Fi access point (AP) and/or the like.

Although illustrated as separate radios, in some embodiments cellular AP 112 and WLAN AP 114 may be a combined AP to provide any combination of cellular and WLAN accesses.

In some examples discussed herein, the cellular access network/type (more generally, 'cellular access') may be referred to as a first access (access(1)) and the WLAN access network/type (more generally 'WLAN access' may be referred to as a second access (access(2)).

Device 120 may be configured with appropriate hardware (e.g., processor(s), memory element(s), antennas and/or antenna arrays, baseband processors (modems), and/or the like), software, logic, and/or the like to facilitate a first over-the-air (air) interface for accessing/connecting to the cellular access (access(1) air interface) and a second air interface for accessing the WLAN access (access(2) air interface). Device 120 may be referred to interchangeably herein as 'user/device 120', 'UE 120', and variations thereof.

In various embodiments, device 120 may be associated with any electronic device, machine, robot, etc. wishing to initiate a flow in system 100. The terms 'user equipment', 'subscriber', 'mobile device', 'device', 'electronic device', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smartphone, a tablet, an IP phone, any other device and/or combination of devices, component, element, and/or object capable of initiating voice, audio, video, media, or data exchanges within system 100. Devices 120 discussed herein may also be inclusive of a suitable interface to a human user such as a microphone, a display, a keyboard, or other terminal equipment. Devices 120 discussed herein may also be any device that seeks to initiate a communication on behalf of another entity or element such as a program, a database, or any other component, device, element, or object capable of initiating an exchange within system 100. It is to be understood that any number of devices 120 may be present in system 100.

Although techniques presented herein illustrate features associated authentication and subscription (e.g., policy) management for device 120 relative to CTF 102, WLC 104, NPF 106, and AAA 108 (which may generally be considered control plane (CP) network elements in some instances) system 100 also illustrates user plane (UP) elements such as user plane entities 116, which may interface with one or more data network(s) 118 that may facilitate user plane (e.g., user data/data transfer) connectivity for per-access device 120 sessions. For example, if device 120 latches onto cellular access (access(1)) and a session (e.g., a protocol data unit (PDU) session) is started for the device 120 via the cellular access, then the device 120 may access data network(s) 118 via user plane entities 116 using access(1) UP network connectivity (e.g., tunnels, etc.) that may be facilitated between cellular AP 112 and user plane entities 116 using any technique as may be understood in the art, now known here and/or hereinafter developed. In another example, if device 120 latches onto WLAN access (access (2)) and a session is started for the device via the WLAN access, then the device 120 may access data network(s) 118 via user plane entities 116 using access(2) UP network connectivity that may be facilitated between cellular AP 112 and user plane entities 116 using any technique as may be understood in the art, now known here and/or hereinafter developed.

In various embodiments, user plane entities 116 may be implemented as any 3GPP-based entities (e.g., Serving Gateways (SGWs), UP SGWs (SGW-Us), Packet Data Network (PDN) Gateways (PGWs), UP PGWs (PGW-Us), combined SGWs/PGWs (e.g., System Architecture Evolution Gateways (SAEGWs), combined UP SGW/PGWs (e.g., S/PGW-Us, SAEGW-Us, etc.), Traffic Detection Functions (TDFs), User Plane Functions (UPFs), and/or the like as may be understood in the art, now known here and/or hereinafter developed) and/or any non-3GPP-based entities (e.g., routers, switches, etc.). In various embodiments, data network(s) 118 may be any combination of the Internet, an Internet Protocol (IP) Multimedia Subsystem (IMS), Ethernet network, Ethernet switching system(s), and/or the like. Although not illustrated, it is to be understood that CTF 102 and/or WLC 104 may interface with user plane entities 116 in any manner/combination.

For techniques presented herein, CTF 102 may provide/be responsible for any combination of cellular-based access authentication services, authorization services, mobility management control, session management services with various functions being supported on a per-session basis, selection and control of user plane entities (e.g., per-session), if applicable, and/or the like. In various embodiments, CTF 102 may be implemented with functionality inherited from any combination of a 4G/LTE Mobility Management Entity, a 4G/LTE Serving Gateway (SGW), a 4G/LTE Packet Data Network (PDN) Gateway (PGW), a 5G Access and Mobility Management Function (AMF), a 5G Session Management Function (SMF), and/or the like now known here or hereafter developed. WLC 104 may provide/be responsible for wireless LAN functions such as, WLAN-based access authentication services, authorization services, intrusion prevention, RF management, and/or the like to facilitate device 120 connectivity via WLAN AP 114. In some implementations, WLC 104 may be configured as an evolved WLC (eWLC). Although illustrated as separate entities for the embodiment of FIG. 1, in at least one embodiment, CTF 102 and WLC 104 may be configured as a combined or converged multi-access termination function (MATF) 130 that may be configured to provide operations, functions, etc. as discussed for embodiments herein for multiple accesses that may be provided via access networks 110.

Further for techniques presented herein, NPF 106 may provide/be responsible for managing subscription/policy information for one or more users/devices (e.g., device 120) that may be present in system 100. In various embodiments for techniques presented herein, per-user/device subscription/policy information may include service quality information such as Quality of Service (QoS) information, QoS Class Identifier (QCI), Guaranteed Bit Rate (GBR), Maximum Bit Rate (MBR), Aggregate Maximum Bit Rate (AMBR) (per-device and/or per-Access Point Name (APN)/ Data Network Name (DNN), Allocation and Retention Priority (ARP), packet delay information, packet loss information, combinations thereof, and/or the like for one or more user/device sessions. In various embodiments, per-user/device subscription policy information may also include APN information, DNN information, combinations thereof, and/or the like for one or more user/device sessions.

In various embodiments for techniques presented herein, NPF 106 may be configured with one or more databases/repositories/etc. and/or may interface with one or more external databases/repositories/etc. in order to obtain and/or be configured with policy information for users/devices that may be present in system 100. Such internal/external databases/repositories/etc. may include any combination of enterprise databases, repositories, and/or the like for one or more users/devices that may be allowed to connect to accesses that may be provided via access networks 110. In various embodiments, NPF 106 may be implemented as a Cisco® DNAC ACA, an enterprise policy server/manager, combinations thereof, and/or the like.

Additionally for techniques presented herein, AAA 108 may provide/be responsible for authentication, authorization, and accounting functions for users/devices (e.g., device 120) that may be present in system 100. AAA 108 may also provide maintain per-user/device session information for various accesses to which each user/device is connected. Generally, authentication refers to the process where an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity, typically inherited from authentication when logging on to an application or service. In various instances, authorization may be determined based on a range of restrictions, for example time-of-day restrictions, or physical location restrictions, or restrictions against multiple accesses by the same entity or user/device. Generally, accounting refers to the tracking of network resource consumption by users/devices for the purpose of capacity and trend analysis, cost allocation, billing, etc.

AAA 108 may be configured with one or more databases/repositories/etc. and/or may interface with one or more external databases/repositories/etc. in order to obtain and/or be configured with per-user/device converged access profile information containing user/device identity information, authentication type attributes (e.g., authentication type, subtype, etc.), and authentication attributes (e.g., credentials, passwords, keys, etc.) for different accesses that may be provided via access networks 110 to which users/devices can connect. In various embodiments, such internal/external databases/repositories/etc. may include any combination of enterprise databases, repositories, and/or the like for one or more users/devices that may be allowed to connect to access networks 110.

The converged access profile for a device, such as device 120, may include a per-access type profile for each access type to which a device is allowed to connect. Identification information for a device (e.g., access identities/identifiers) for each of multiple access types to which the device is allowed to connect (e.g., WLAN/wired, cellular, etc.) is provided in the converged access profile for the device. Different access specific identifiers/identities for a device can be envisioned. For example, International Mobile Subscriber Identity (IMSI), etc. may be used for cellular accesses, Network Access Identifier (NAI) may be used for enterprise WLAN/wired accesses, etc. Other user/device identifiers can be envisioned including, but not limited to, International Mobile Equipment Identity (IMEI), IMEI software version (IMEISV), Permanent Equipment Identifier (PEI), Subscription Concealed Identifier (SUCI), Universally Unique Identifier (UUID), station (STA) serial number, factory configured Media Access Control (MAC) address, any other stable or permanent identifier for a user/device, combinations thereof, and/or the like now known or hereafter developed. As referred to herein, a stable identifier for a user/device may refer to a user/device identifier that consistently identifies the user/device for a particular system (e.g., system 100) and a permanent identifier for a user/device may refer to a user/device identifier that consistently identifies the user/device across multiple systems.

In some implementations a converged access profile configured for a particular user/device via AAA 108 may be configured as a combined profile including multiple per-access type entries for each access type to which the particular user/device can connect. In other implementations, a converged access profile configured for a particular user/device via AAA 108 may be configured using separate per-access profiles in which each per-access profile/entry for the particular user/device can be correlated together by AAA 108 based on the user/device access specific identities/identifiers configured for each access type. For example, AAA 108 can correlate or link multiple entries/access type profiles for a converged access profile of a user/device such that a WLAN/wired access identifier/identity for the user/device can be mapped to a cellular (e.g., private LTE) access identity/identifier for the user/device, or vice-versa. Such linking functionality may be utilized by AAA 108 when creating/maintaining/updating session information for a user/device for multiple accesses and/or for performing other operations/functions as described herein.

AAA 108 may be capable of interfacing/communicating with other elements of system 100 (e.g., CTF 102 and WLC 104) via Remote Authentication Dial-In User Service (RADIUS) protocol mechanisms (e.g., messaging, signaling, etc.). In various embodiments, AAA 108 may be implemented as a Cisco® ISE, an AAA function/service/server/element/node/etc., combinations thereof, and/or the like.

During operation, techniques provided by the present disclosure include introducing a new authentication method for AAA 108 in which the authentication method is invoked for authenticating a private cellular (e.g., Private LTE, etc.) user/device. Various authentication attributes can be used to support a user/device (e.g., device 120) including a user/device identifier such as IMSI, a subscriber key (referred to herein as 'K' or 'Ki'), an operator key (referred to herein as Opc), an Authentication Management Field, and an Access Point Name (APN) for 4G/LTE networks or a Data Network Name (DNN) for 5G networks. Various authentication attributes, authentication type attributes, and the like can be configured for a converged access profile for the user/device in AAA 108. Policy information for the user/device can be configured in NPF 106.

In a conventional 4G/LTE access architecture, the S6a interface (as defined at least by 3GPP TS 29.272) supports services such as authentication and location updates through exchanges of DIAMETER messages such as DIAMETER-based Authentication-Information-Request (AIR) and Authentication-Information-Answer (AIA) for authentication services and Update-Location-Request (ULR), Update-Location-Answer (ULA), Cancel-Location-Request (CLR) and Cancel-Location-Answer (CLA) for location services.

However, the techniques provided by the present disclosure involving the S6a-Auth interface provide for an exchange of RADIUS messages such as a RADIUS Access Request message as a replacement for the DIAMETER AIR message and a RADIUS Access Accept message as a replacement for the DIAMETER AIA message in order to facilitate device 120 authentication operations for cellular and WLAN access authentications. ULR and ULA functions may not be involved and may be handled internally at the CTF 102. ULA messages typically include various flags, subscription data, PDN type, Access Point Name (APN) names, QoS attributes, etc. An APN can be included in an Access Accept message; however, most of the ULA flags are not relevant in private LTE deployments. Additionally, subscription data in an enterprise environment is typically not for an individual subscriber and can be handled locally in CTF 102.

During operation, for device 120 seeking to establish a cellular session in system 100 via cellular access point 112, CTF 102 may generate and transmit a RADIUS Access Request message to AAA 108. Upon receiving the RADIUS Access Request message by AAA 108 from CTF 102 that includes a matching user/device identifier (e.g., IMSI) for a converged access profile of the device 120 configured for AAA 108, authentication techniques provided by the present disclosure involve an Evolved Packet System Authentication and Key Agreement (EPS-AKA) method/function/logic running in AAA 108 that can be triggered to facilitate generation of an authentication vector (AV): {AUTN, RAND, XRES, and KASME}, in which 'AUTN' is an authentication token, 'RAND' is a random challenge, 'XRES' is an expected response to the challenge, and 'KASME' (Access Security Management Entity Key) is a root key. In at least one embodiment, the EPS-AKA logic can perform operations for generating the authentication vector according to techniques as prescribed at least by Internet Engineering Task Force (IETF) Request For Comments (RFC) 5448 and RFC 4187.

Although techniques presented herein are discussed with reference to EPS-AKA mechanisms for cellular authentication, this is not meant to limit the broad scope of the present disclosure. In various implementations, other authentication mechanisms/protocols may be utilized as may be understood in the art, now known here and/or hereinafter developed, which may or may not result in the generation of different authentication vectors/authentication information that may be utilized for authenticating users/devices to various access types.

The Access Request message generated by CTF 102 may include elements of an Password Authentication Protocol (PAP) authentication mechanism, which typically includes presenting a username and password by a user/device for authentication but which, for embodiments of techniques presented herein, can be overloaded with vendor-specific attributes to include an identity of device 120, such as IMSI, and a password (e.g., an unencrypted, readable password such as a Cleartext password). The password may not be a subscriber specific password but instead may be considered an authentication attribute that, along with the user/device identity of device 120 presented in the Access Request message, can be recognized by AAA 108 to trigger the EPS-AKA function in order to generate the authentication vector for authenticating the device 120 for the cellular access.

Upon generation of the authentication vector, AAA 108 sends a RADIUS Access Accept message to CTF that may include various attributes such as, but not limited to, the device 120 identity (e.g., IMSI), the generated authentication vector including {AUTN, RAND, XRES, and KASME}, the APN (or DNN, if applicable), and a NAI for the device 120. As discussed in further detail herein with regard to FIGS. 2A-2D, the authentication vector can be used to perform an authentication between device 120 and CTF 102 to generate a cipher key (CK) and an integrity key (IK) when device 120 connects to cellular AP 112.

In some instances, an Access Accept message may additionally and/or alternatively include subscription/policy information such as QCI, etc. For example, in some implementations, various default parameters, such as QCI, may be configured in AAA 108, which may be overridden by any matching parameters (e.g., QCI) that may also be configured in NPF 106. In still some instances, an Access Accept message may additionally and/or alternatively include WLAN and/or any other access-related context information for the device 120 for any other accesses to which the device 120 may be connected at the time of the cellular attach. For example, if the device 120 is also connected to/has a session for the WLAN access when the device 120 latches on to the cellular access, the Access Accept message can additionally include any device 120 WLAN context information, which may include, but not be limited to, an indication that the device 120 is attached to the WLAN access, a IP address for the device 120 for the WLAN session, an IP address for WLC 104, combinations thereof, and/or the like. IP addresses as discussed for embodiments described herein may be configured as IP version 4 (IPv4) and/or IP version 6 (IPv6) addresses.

These examples are only a few of the different types of information (e.g., authentication attributes, authentication vector, policy information, context information, etc.) are only a few of the many different types of information that may be included in Access Accept messages. Virtually any information types, combinations, may be included within Access Accept messages to facilitate operations/functions/ etc. in accordance with techniques presented herein and, thus, are clearly within the scope of the present disclosure.

As noted previously, AAA 108 may create/maintain/ update session information for device 120 for multiple accesses to which device 120 may be connected. Additionally, CTF 102 may maintain session information for device 120 related to a cellular access session for the device 120, which can include context information for the device 120 for other accesses, such as the WLAN access, to which the device 120 may or may not be connected. For example, context information may include the device's IP address on the WLAN access, the IP address for the WLAN AP/WLC to which it is attached, etc. In another example, context information related to cellular access can include the device's IP address on the cellular access, the IP address for the cellular AP/CTF to which it is attached, etc. Further, WLC 104 may maintain session information for the device 120 related to a WLAN access session for the device 120, which can include context information for the device for other accesses, such as the cellular access, to which the device 120 may or may not be connected.

During operation in some embodiments, if device 120 is connected to a first access type (e.g., WLAN) and then connects to a second access type (e.g., cellular) AAA 108 can generate and transmit a Change of Authorization (CoA) Request message that may include, at least in part, context information for device 120 associated with the second (e.g., cellular) access type. In still some embodiments, if device 120 is connected to multiple accesses and is detached from a particular access, a termination function of the other access type(s) may be notified via a CoA Request message that may include, at least in part, context information for device 120 associated with the access from which the device 120 was detached.

Accordingly, through techniques discussed herein, system 100 provides for the ability to define and implement an approach for unifying authentication and policy management interfaces across WLAN (e.g., Wi-Fi), wired, and private cellular (e.g., Private LTE) access technologies. In at least one embodiment, this approach may advantageously allow enterprise Information Technology (IT) to eliminate the need for deploying a 3GPP-HSS for private cellular user authentication, and instead can use the existing authentication and policy management functions to facilitate authentication/policy management operations, independent of the radio access. Furthermore, with the use of a converged user/device profile in an AAA (e.g., AAA 108) (with correlated RAT specific user/device identities/identifiers) enterprise IT can advantageously correlate user/device sessions across multiple access sessions (e.g., private LTE, Wi-Fi, and wired) and enforce a common user/device policy.

Referring to FIGS. 2A, 2B, 2C, and 2D, FIGS. 2A, 2B, 2C, and 2D are a message sequence diagram illustrating a call flow 200 for providing authentication using AAA 108 and subscription management using NPF 106 of FIG. 1 to provide private cellular access and WLAN access for device 120, according to an example embodiment. FIGS. 2A-2D include device 120, CTF 102, WLC 104, NPF 106, and AAA 108. Various example details discussed for the embodiment of FIGS. 2A, 2B, 2C, and 2D are described with reference to 4G/LTE constructs (e.g., APN, etc.); however, it is to be understood that techniques presented herein may be applied to any multi-access architecture.

At 202, a converged access profile for device 120 is provided (e.g., via RADIUS profile configuration) for AAA 108 for various accesses to which device 120 is authorized to connect to include the WLAN access and the cellular access. Although the converged access profile provided for device 120 at 202 is illustrated as a combined access profile, in some embodiments, a converged access profile for a user/device can be configured as separate per-access profiles (e.g., a separate WLAN profile and a separate cellular profile) for the user/device that can be correlated together for the user/device by AAA 108 based on RAT specific user/ device identities/identifiers such as IMSI for cellular access and NAI for WLAN access. Other variations can be envisioned.

A converged access profile for a device (e.g., device 120) can be configured using vendor/operator-specific attribute value pairs (AVPs) to identify various user/device identities/ identifiers, authentication attributes, authentication type attributes, and/or the like. Consider an example in which the converged access profile for device 120 can be provided as a combined profile configuration using FreeRADIUS. In this example, consider that device 120 has a NAI set to 'abc@operator.com' and an IMSI set to '123456789012345' in which the NAI is an identifier for device 120 for the WLAN access provided via WLAN AP 114/WLC 104 and the IMSI is an identifier for device 120 for the cellular access.

Consider for the present example that the converged access profile for device 120 includes a WLAN profile that is configured with information including:

abc@operator.com;
Authentication-Type=EAP (Extensible Authentication Protocol);
EAP-Type=TTLS/PEAP (Tunneled Transport Layer Security/Protected EAP); and
operator-avpair:='imsi=123456789012345'.

Thus, in addition to other information associated with WLAN access for device 120, both the identifier for device 120 for the WLAN access (NAI=abc@operator.com) and the identity of device 120 for the cellular access (imsi=123456789012345) are included in the WLAN profile for device 120.

Further consider for the present example that the converged access profile for device 120 includes a cellular profile that is configured with information including:

operator-avpair:='operator-mobile-node-identifier=123456789012345';

'123456789012345 Cleartext-Password:='operator';

operator-avpair:='ki=12233445566778899aabb-ccddeeff00' (the subscriber key for device 120);

operator-avpair:='opc=1111222233334444aaaabbbb-ccccdddd' (the operator key for the operator); and operator-avpair:='nai=abc@operator.com'.

Thus, in addition to other information associated with cellular access for device 120 (e.g., authentication attributes including password, ki, and opc), both the identity of device 120 for the cellular access (imsi=123456789012345) and the identifier for device 120 for the WLAN access are included in the cellular profile for device 120. AAA 108 may also be configured with an Authentication Management Field that facilitates generation of an authentication vector via an EPS-AKA function provided for AAA 108. In at least one embodiment, the Authentication Management Field can be configured as part of a boot configuration for AAA 108.

At 204, NPF 106 is configured with a subscription/policy profile for device 120. Consider, for the present example, that subscription/policy profile for device 120 includes:

operator-avpair:='nai=abc@operator.com';

operator-avpair:='operator-apn=cbrs.com' (identifying an APN for the present example);

operator-avpair:='operator-qci=9' (identifying a QCI for a cellular session for device 120).

It is to be understood that QCI=9 is provided for illustrative purposes only and is not meant to limit the broad scope of the present disclosure. Virtually any QCI and/or any other policy information for users/devices can be included in subscription/policy profiles configured for a network policy function (e.g., NPF 106) and, thus, is clearly within the scope of the present disclosure. Although examples herein are discussed with reference to IMSI and NAI user/device identifiers, it is to be understood that exchanges with any combination of AAA 108 and NPF 106 can be performed using any user/device identifiers such as, for example, SUCI, UUID, or any other stable/permanent identifier for the user/device.

Different attach scenarios are illustrated in FIGS. 2A-2D including a first attach scenario 210 in which device 120 first attaches to the WLAN access and then attaches to the cellular access and a second attach scenario 260 in which device 120 first attaches to the cellular access.

At 211, for the first attach scenario 210, consider that device 120 first latches on to the WLAN AP 114 for a WLAN session to be facilitated via WLC 104. Upon determining device 120 latching on to the WLAN AP 114, WLC 104 sends AAA 108 a RADIUS Access Request message at 212 including, at least in part, the WLAN identifier for device 120 for the WLAN access (nai=abc@operator.com). At 213, AAA 108 maintains session information for device 120 in which, among other information, AAA 108 stores an IP address for WLC 104 and performs the EAP PEAP/TLS authentication for the device. At 214, AAA 108 sends a RADIUS Access Accept message to WLC 104, which causes WLC 104 to learn the device 120 IP address for the WLAN access session at 215 via Control and Provisioning of Wireless Access Points (CAPWAP) messages from the WLAN AP (not shown in FIG. 2A) as prescribed at least by RFC 5415.

At 216, after learning the IP address for device 120, WLC 104 starts accounting for the device and sends AAA 108 an Accounting Start message that includes the identifier for device 120 for the WLAN access (NAI), an indication of the attachment type for the device (ATT='wlan'), and the device 120 IP address for the WLAN session (device-wlan-ipaddress). At 217, AAA 108 updates the session information maintained for device 120.

At 218, consider that device 120 latches on to cellular AP 112 for a cellular session to be facilitated via CTF 102 after the WLAN session has been started for device 120. Upon determining device 120 latching on to cellular AP 112, CTF 102 sends AAA 108 a RADIUS Access Request message (via the S6a-Auth interface) at 219 that includes the identity of device 120 associated with the cellular access (imsi=123456789012345) and the authentication password (password='operator').

Upon AAA 108 receiving the Access Request message and identifying the identity of device 120 and the password included in the message, the EPS-AKA function is triggered for AAA 108 at 220 to generate the authentication vector including {AUTN, RAND, XRES, KASME}. Additionally, at 221 the NAI for device 120 can be obtained from the identity of device 120 associated with the cellular access (IMSI) included in the Access Request message based on the cellular profile for device 120 configured for AAA 108. Using the NAI, AAA 108 determines and fetches the existing session information maintained for device 120 and updates the device 120 session at 221 to include the identity (IMSI) for device 120 associated with the cellular access and the IP address for CTF 102.

At 222, AAA 108 generates and sends (e.g., transmits) a RADIUS Access Accept message to CTF 102 that includes the IMSI and the NAI for device 120, the generated authentication vector {AUTN, RAND, XRES, KASME}, and WLAN context information for device 120 associated the pre-existing WLAN session for device 120, which for the present example may include an indication (e.g., a status flag, an AVP, etc.) that the device 120 is also attached to the WLAN access (wlan-attach) and the device 120 IP address for the WLAN session (device-wlan-ipaddress).

Figure 2A:
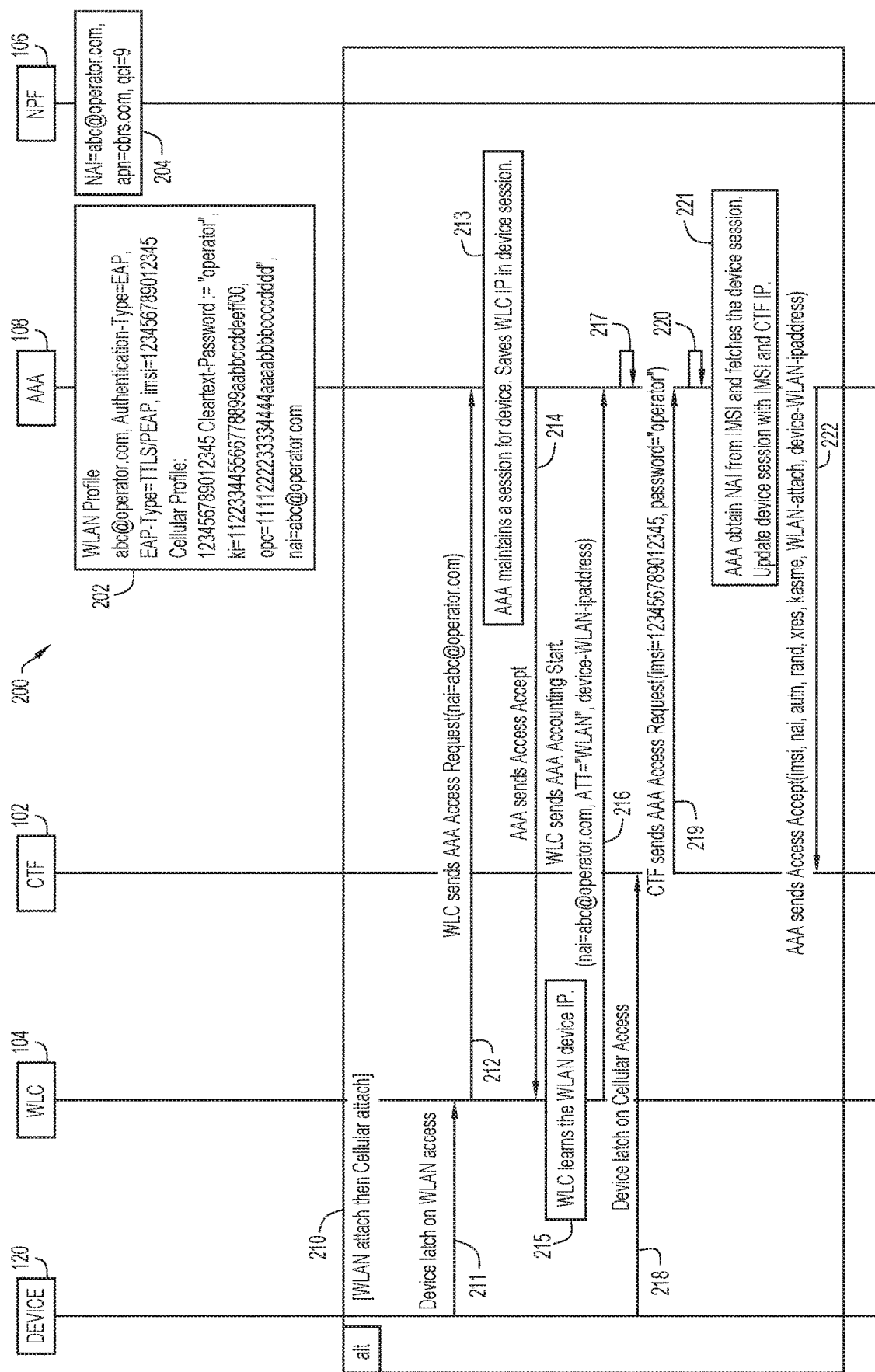
FIGS. 2A, 2B, 2C, and 2D are a message sequence diagram illustrating a call flow for providing authentication using an authentication, authorization, and accounting function (AAA) and subscription management using a network policy function (NPF) of FIG. 1 to provide private cellular access and wireless local area network (WLAN) access for a device, according to an example embodiment.
Figure 2B:
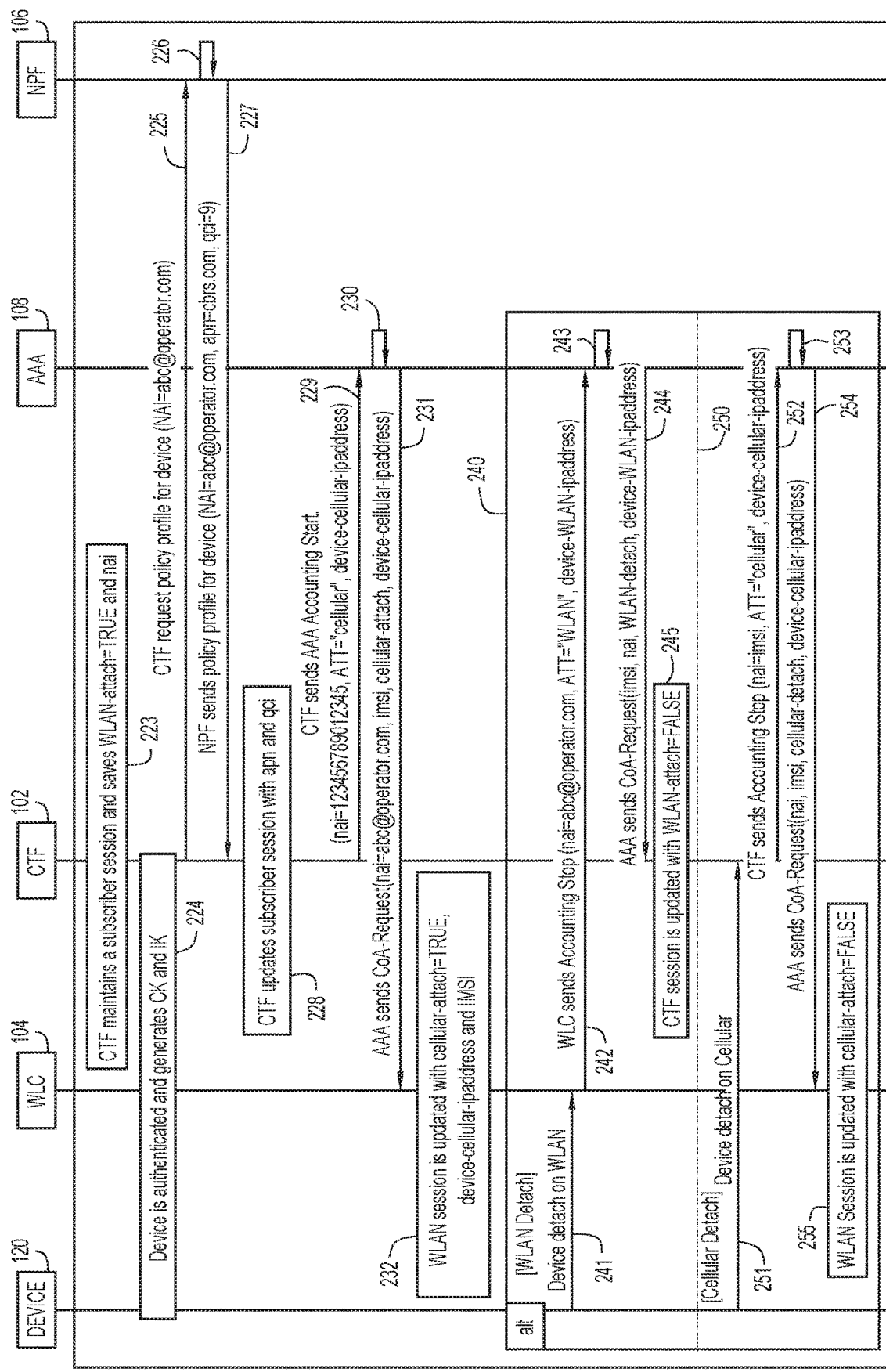

As shown in FIG. 2B at 223, CTF 102 maintains a subscriber session for device 120 and stores in the session an indication that the device 120 is attached to the WLAN access (wlan-attach=TRUE), the identifier for device 120 for the WLAN access (NAI), and the device 120 IP address for the WLAN session (device-wlan-ipaddress). At 224, device 120 is authenticated via CTF 102 and CK and IK are generated for the cellular access session to secure communications for the session.

At 225, CTF 102 requests the policy profile for device 120 from NPF 106 (via the S6a-SM interface) using the identifier for the device 120 associated with the WLAN access (nai=abc@operator.com). Although the present example utilizes the WLAN access identifier for the device 120 for the policy request, in other implementations, the identifier for the device 120 associated with the cellular access (e.g., IMSI) may be used to query NPF 106 for the policy profile of the device. At 226, NPF 106 identifies the policy profile for device 120 using the NAI and, at 227, returns the policy profile to CTF 102 including the NAI, the APN, and the QCI included in the profile for device 120. At 228, CTF 102 updates the subscriber session maintained for device 120 to include the APN and the QCI received from NPF 106.

As shown at 229, CTF 102 can send a RADIUS Accounting Start message to AAA 108 that includes the NAI set to the cellular identity (IMSI) for device 120 (e.g., NAI=123456789012345), an indication of the attachment type for the device (ATT='cellular'), and the device 120 IP address for the cellular session (device-cellular-ipaddress). Generally, from the AAA perspective, NAI in the Accounting Start message can be an attribute, which for techniques provided herein can be set to either the device's WLAN identifier or the device's cellular identifier. At 230, AAA 108 updates the session information maintained for device 120.

Based on the updated session information for device 120 indicating attachment to another access (e.g., the cellular access), AAA 108 can send a RADIUS CoA-Request message to WLC 104 at 231 that includes the WLAN identifier (NAI) for device 120, the cellular identity (IMSI) for device 120, and context information for device 120 associated with the other access, which for the present example may include an indication that the device 120 is currently attached to the cellular access (cellular-attach) and the device 120 IP address for the cellular session (device-cellular-ipaddress). At 232, WLC 104 updates the subscriber session for device 120 and stores in the session an indication that the device 120 is currently attached to the cellular access (cellular-attach=TRUE), the identity for device 120 for the cellular access (IMSI), and the device 120 IP address for the cellular session (device-cellular-ipaddress).

In various embodiments, AAA 108 can generate a session event notification, such as a CoA message, to provide for the ability to indicate cellular session creation/termination events to WLC 104 and/or WLAN session creation/termination events to CTF 102. A session event notification provided generated by AAA 108 can include a user's/device's access specific context information such as, for example, access specific identifiers/identities (e.g., IMSI, NAI, etc.), access specific IP address information for the user/device, IP address information for the termination function (e.g., CTF, WLC, etc.) to which the user/device session is anchored for a particular access, an indication of an attachment or detachment of the device from a particular access, combinations thereof, and/or the like. Such context information may allow termination functions associated with different accesses (e.g., CTF, WLC, etc.) to correlate/maintain/update the user's/device's access sessions. RADIUS Accounting Start/Stop messages may be used by such termination functions for each access to communicate session information to AAA 108 as different session events may occur.

Consider, for example, different detach scenarios associated with device 120 including a first detach scenario 240 in which the device 120 detaches from the WLAN access and a second detach scenario 250 in which the device 120 detaches from the cellular access.

As shown at 241 for the first detach scenario 240, consider that device 120 detaches from the WLAN access, which triggers WLC 104 to send an Accounting Stop message to AAA 108 at 242 that includes the identifier for device 120 for the WLAN access (NAI), an indication of the WLAN attachment type (ATT='wlan'), and the device 120 IP address for the WLAN access (device-wlan-ipaddress). At 243, AAA 108 determines and fetches the session information for device 120 using the NAI and updates the session information to indicate that the device 120 is detached from the WLAN access. Based on the update, AAA 108 sends a CoA-Request message to CTF 102 at 244 that includes the WLAN identifier (NAT) for device 120, the cellular identity (IMSI) for device 120, and context information for device 120 associated with the WLAN access, which for the present example may include an indication that the device 120 is detached from WLAN access (wlan-detach) and the device 120 IP address for the WLAN session (device-wlan-ipaddress). At 245, CTF 102 updates the cellular session for device 120 to include an indication that the device 120 is currently detached from the WLAN access (wlan-attach=FALSE).

As shown at 251 for the second detach scenario 250, consider that device 120 detaches from the cellular access, which triggers CTF 102 to send an Accounting Stop message to AAA 108 at 252 that includes the NAI set to the identity for device 120 for the cellular access (NAI=IMSI), an indication of the cellular attachment type (ATT='cellular'), and the device 120 IP address for the cellular access (device-cellular-ipaddress). At 253, AAA 108 determines and fetches the session information for device 120 using the IMSI and updates the session information to indicate that the device 120 is detached from the cellular access. Based on the update, AAA 108 sends a CoA-Request message to WLC 104 at 254 that includes the WLAN identifier (NAI) for device 120, the cellular identity (IMSI) for device 120, and context information for device 120 associated with the cellular access, which for the present example may include an indication that the device 120 is detached from cellular access (wlan-detach) and the device 120 IP address for the WLAN session (device-wlan-ipaddress). At 255, WLC 104 updates the WLAN session for device 120 to include an indication that the device 120 is currently detached from the cellular access (cellular-attach=FALSE).

Thus, as shown for the first and second detach scenarios 240, 250, termination functions associated with different accesses (e.g., CTF 102, WLC 104, etc.) to correlate and update access sessions for device 120.

Figure 2C:
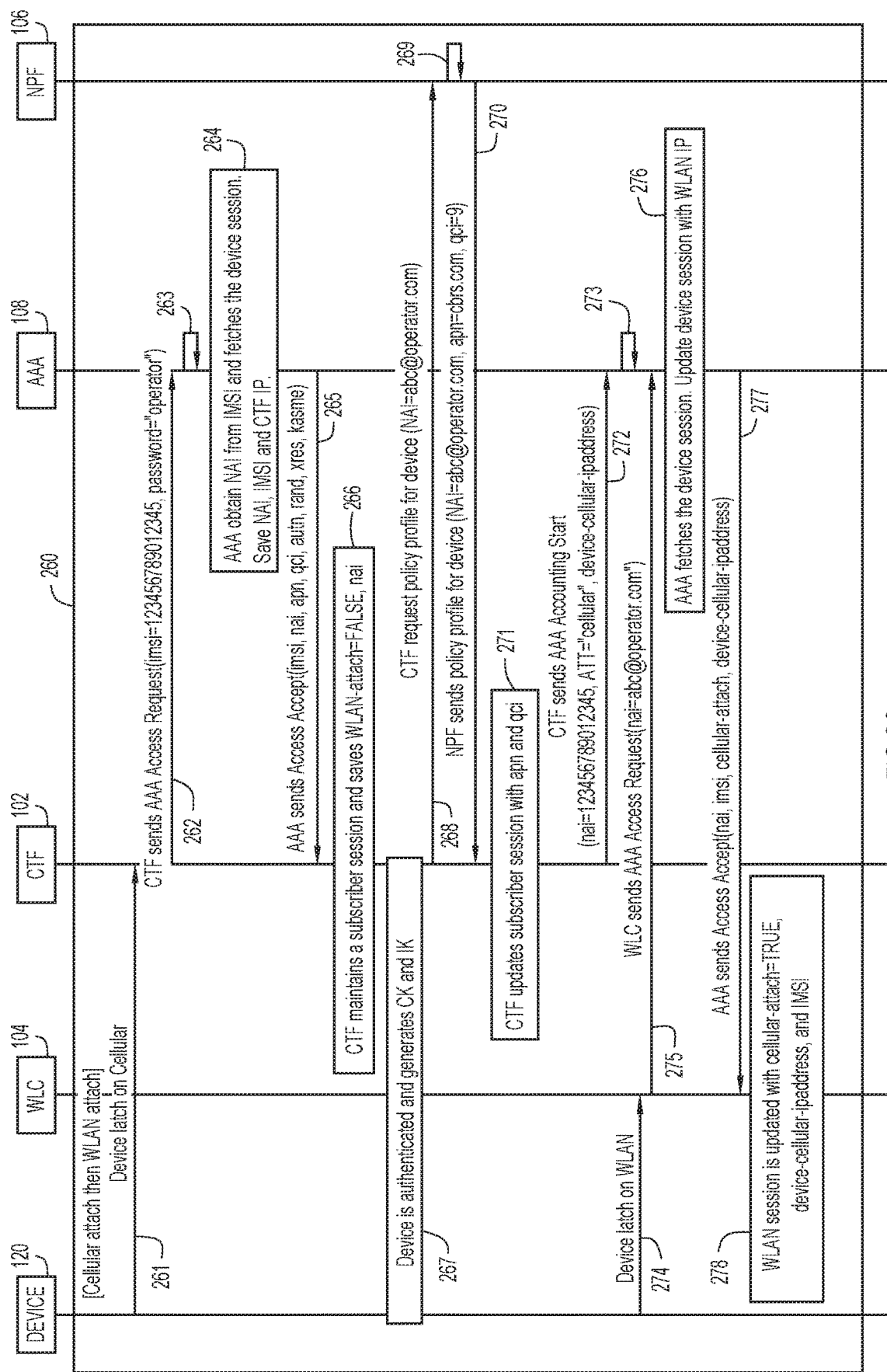

Returning to attach scenarios, consider for the second attach scenario 260 that device 120 first latches on to cellular AP 112 for a cellular session to be facilitated via CTF 102, as shown at 261 in FIG. 2C. Upon determining device 120 latching on to cellular AP 112, CTF 102 sends AAA 108 a RADIUS Access Request message (via the S6a-Auth interface) at 262 that includes the identity of device 120 associated with the cellular access (imsi=123456789012345) and the authentication password (password='operator').

Upon AAA 108 receiving the Access Request message and identifying the identity of device 120 and the password included in the message, the EPS-AKA function is triggered for AAA 108 at 263 to generate the authentication vector including {AUTN, RAND, XRES, KASME}. Additionally, at 264 the NAI for device 120 can be obtained from the identity of device 120 associated with the cellular access (IMSI) included in the Access Request message based on the cellular profile for device 120 configured for AAA 108. AAA 108 creates a session for device 120 and saves NAI, the IMSI and the IP address for CTF 102.

At 265, AAA 108 generates and sends a RADIUS Access Accept message to CTF 102 that includes the IMSI and the NAI for device 120 and the generated authentication vector {AUTN, RAND, XRES, KASME}. For the second attach scenario 260, since device 120 first attaches to the cellular access before attaching to the WLAN access, there is no WLAN context information for device 120 associated with a WLAN session; thus, no WLAN context information for device 120 is included in the Access Accept message sent by AAA 108 for the second attach scenario 260.

At 266, CTF 102 maintains a subscriber session for device 120 and, since no WLAN context information was received for device 120 in the Access Accept message, CTF stores in the session an indication that the device 120 is not attached to the WLAN access (wlan-attach=FALSE). At 267, device 120 is authenticated via CTF 102 and CK and IK are generated for the cellular access session to secure communications for the session.

At 268, CTF 102 requests the policy profile for device 120 from NPF 106 (via the S6a-SM interface) using the identifier for the device 120 associated with its WLAN session. As discussed above, in some implementations, a cellular access identifier for the device 120 may also be used to query NPF 106 for the policy profile of the device. At 269, NPF 106 identifies the policy profile for device 120 using the NAI and, at 270, returns the policy profile to CTF 102 including the NAI, the APN, and the QCI included in the profile for device 120. At 271, CTF 102 updates the subscriber session maintained for device 120 to include the APN and the QCI received from NPF 106.

As shown at 272, CTF 102 can send a RADIUS Accounting Start message to AAA 108 that includes NAI set to the cellular identity (NAI=IMSI) for device 120, an indication of the attachment type for the device (ATT='cellular'), and the device 120 IP address for the cellular session (device-cellular-ipaddress). At 273, AAA 108 updates the session information maintained for device 120.

At 274, consider that device 120 latches on to WLAN AP 114 for a WLAN session facilitated via WLC 104 after the cellular session has been started for device 120. Upon determining device 120 latching on to WLAN AP 114, WLC 104 sends AAA 108 a RADIUS Access Request message at 275 including, at least in part, the WLAN identifier for device 120 for the WLAN access (nai=abc@operator.com). At 276, AAA 108 determines and fetches the existing session information maintained for device 120 and updates the device 120 session to include the IP address for CTF 102.

Figure 2D:
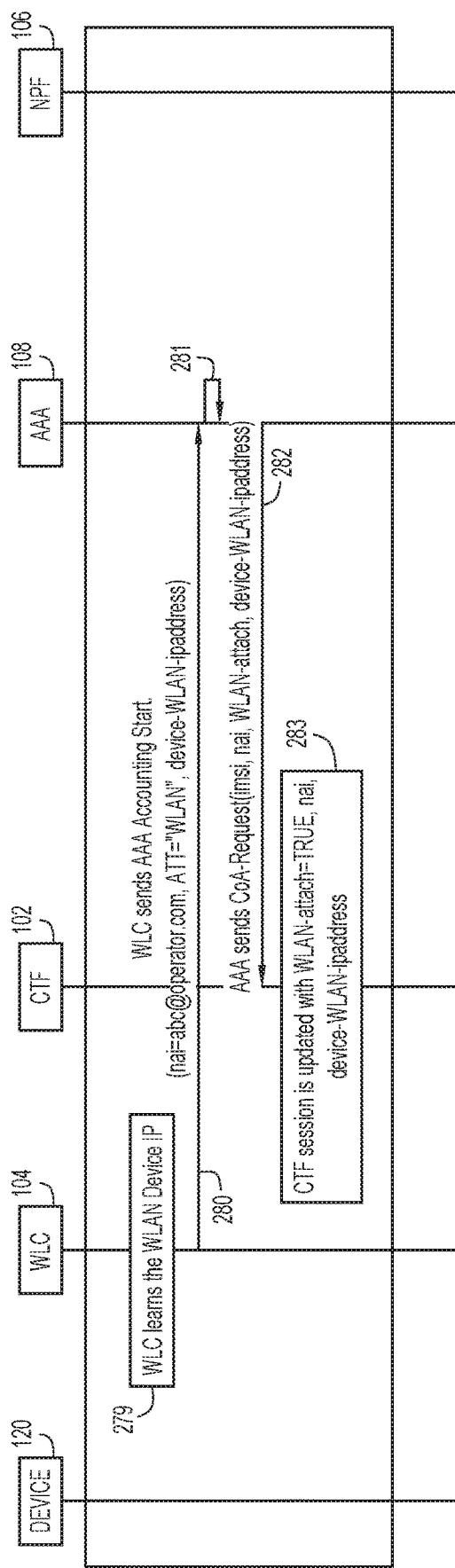

At 277, AAA 108 sends a RADIUS Access Accept message to WLC 104 that includes, at least in part, the IMSI and the NAI for device 120 and cellular context information for device 120 associated the pre-existing cellular session for device 120, which for the present example may include an indication (e.g., a status flag, an AVP, etc.) that the device 120 is also attached to the cellular access (cellular-attach) and the device 120 IP address for the cellular session (device-cellular-ipaddress). At 278, WLC 104 updates a WLAN session for device 120 that includes an indication that the device 120 is attached to the cellular access (cellular-attach=TRUE), the identity for device 120 for the cellular access (IMSI), and the device 120 IP address for the cellular session (device-cellular-ipaddress). As shown in FIG. 2D at 279, WLC 104 learns the device 120 IP address for the WLAN access session.

At 280, WLC 104 can send AAA 108 an Accounting Start message that includes the identifier for device 120 for the WLAN access (NAI), an indication of the attachment type for the device (ATT='wlan'), and the device 120 IP address for the WLAN session (device-wlan-ipaddress). At 281, AAA 108 updates the session information maintained for device 120. Based on the updated session information for device 120 indicating attachment to another access (e.g., the WLAN access), AAA 108 can send a RADIUS CoA-Request message to CTF 102 at 282 that includes the WLAN identifier (NAI) for device 120, the cellular identity (IMSI) for device 120, and context information for device 120 associated with the other access, which for the present example may include an indication that the device 120 is currently attached to the WLAN access (wlan-attach) and the device 120 IP address for the WLAN session (device-wlan-ipaddress). At 283, CTF 102 updates the subscriber session for device 120 and stores in the session an indication that the device 120 is currently attached to the WLAN access (wlan-attach=TRUE), the identity for device 120 for the WLAN access (NAI), and the device 120 IP address for the WLAN session (device-wlan-ipaddress).

Accordingly, as shown in FIGS. 2A-2D, techniques presented herein provide for unifying authentication and policy management interfaces across multiple access technologies. Furthermore, with the use of a converged user/device profile in an AAA 108, with correlated RAT specific user/device provides for the ability to correlate user/device sessions across multiple access sessions and enforce a common user/device policy.

Figure 3:
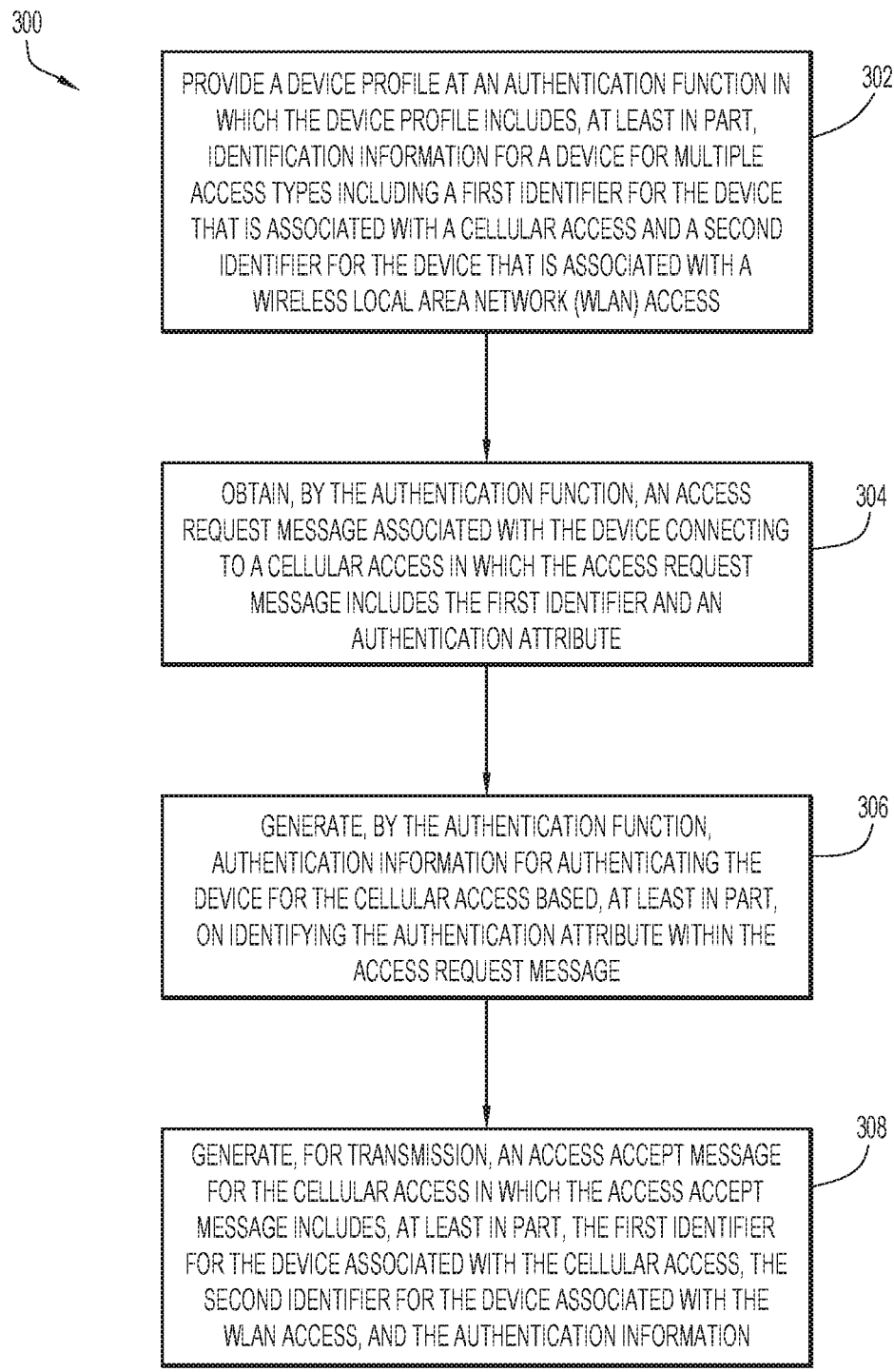
FIG. 3 is a flow chart depicting a method according to an example embodiment.

Referring to FIG. 3, FIG. 3 is a flow chart depicting a method 300 according to an example embodiment. In at least one embodiment, method 300 may be associated with operations that may be performed by an authentication function (e.g., AAA 108) associated with authentication of a device (e.g., user/device 120) for a cellular access (e.g., cellular access provided via cellular AP 112/CTF 102).

At 302, the method may include providing a device profile at the authentication function in which the device profile includes, at least in part, identification information for a device for multiple access types including a first identifier for the device that is associated with a cellular access (e.g., an IMSI for the device) and a second identifier for the device that is associated with a WLAN access (e.g., an NAI for the device). The device profile may be a converged access profile for the device that includes a per-access type profile for each access type to which a device is allowed to connect.

Identification information for the device provided in the device profile may facilitate correlating or linking multiple entries/access type profiles for the device by the authentication function such that the authentication function can map the WLAN/wired access identifier/identity (NAI) for the device to the cellular (e.g., private LTE) access identity/identifier (IMSI) for the device, or vice-versa. In at least one embodiment, such linking functionality may be utilized by the authentication function when creating/maintaining/updating session information for the device for multiple accesses (e.g., for obtaining NAI for a device using the IMSI for the device, etc.).

In at least one embodiment, the device profile (e.g., converged access profile) for the device can be configured as a combined profile that includes cellular profile information for the device and WLAN profile information for the device. In at least one embodiment, the device profile for the device can be configured as separate per-access type profiles configured for the device. In at least one embodiment, cellular profile information for the device may include the first identifier for the device that is associated with the cellular access, the second identifier for the device that is associated with the wireless local area network access, a password, a device key associated with the device, and an operator key associated with an operator of the cellular access (e.g., an enterprise of a private cellular access network). In at least one embodiment, WLAN profile information for the device may include the first identifier for the device that is associated with the cellular access, the second identifier for the device that is associated with the WLAN access, and authentication type information associated with an authentication mechanism (e.g., EAP, EAP-TTLS/PEAP) for the WLAN access.

At 304, the method may include the authentication function obtaining an access request message associated with the device connecting to the cellular access. The access request message may include the first identifier for the device and an authentication attribute. In at least one embodiment, the authentication attribute may be a password associated with a PAP authentication mechanism. The access request message may be a RADIUS Access Request message generated and transmitted by a function (e.g., CTF 102) associated with the cellular access. In at least one embodiment, the access request message may be obtained by the authentication function via an S6a-Auth interface.

At 306, the method may include the authentication function generating authentication information for authenticating the device for the cellular access based, at least in part, on identifying the authentication attribute within the access request message. In at least one embodiment, the generating at 306 may include identifying the authentication attribute within the access request message, identifying the first identifier for the device as being associated with the cellular access (e.g., based on the authentication function identifying/matching the authentication attribute and the first identifier for the device using the configured device profile that includes the cellular profile for the device), and generating the authentication information using an AKA mechanism (e.g., an EPS-AKA mechanism). The generated authentication information may include an authentication vector (e.g., {AUTN, RAND, XRES, KASME}) that may be used for authenticating the device for the cellular access.

At 308, the method may include the authentication function generating, for transmission, an access accept message for the cellular access in which the access accept message includes, at least in part, the first identifier for the device associated with the cellular access, the second identifier for the device associated with the WLAN access, and the authentication information. In at least one embodiment, the access accept message may be a RADIUS Access Accept message. In at least one embodiment, the access accept message may be generated for transmission via the S6a-Auth interface to a function associated with the cellular access (e.g., CTF 102). In at least one embodiment, the access accept message may additionally include context information for the device associated with the WLAN access and/or any other access. In various embodiments, context information may include any combination of an indication that the device is connected to the WLAN access, an IP address for the device associated with the WLAN access, an IP address for a function (e.g., WLC 104) handling a WLAN session for the device, and/or any other context information that may be associated with the WLAN access.

Figure 4:
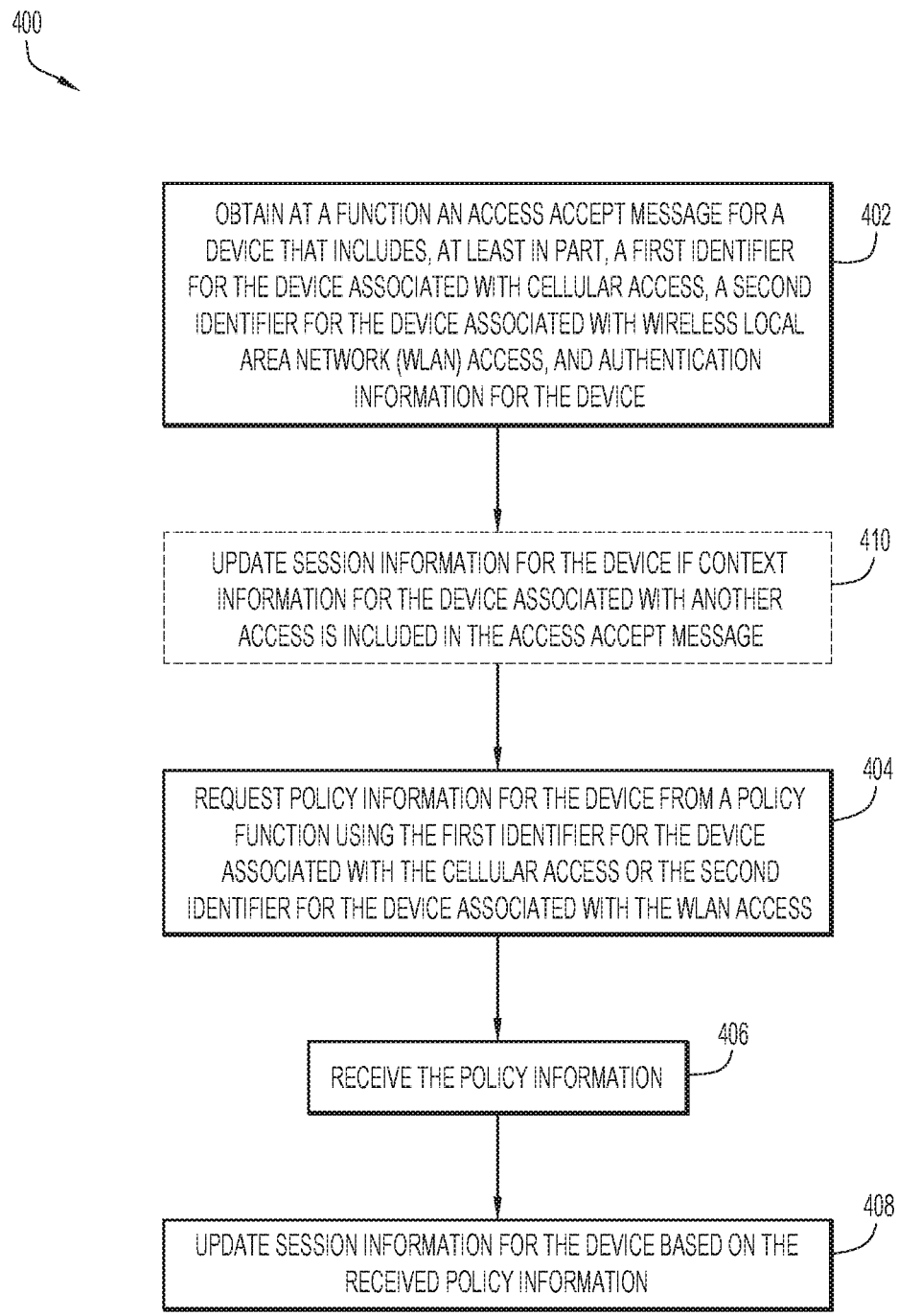
FIG. 4 is a flow chart depicting another method according to an example embodiment.

Referring to FIG. 4, FIG. 4 is a flow chart depicting a method 400 according to an example embodiment. In at least one embodiment, method 400 may be associated with operations that may be performed by a function associated with a cellular access (e.g., CTF 102, MATF 130, etc.) that may handle a cellular access session for a user/device (e.g., device 120).

At 402, the method may include obtaining at the function an access accept message for a device that includes, at least in part, a first identifier for the device associated with cellular access (e.g., IMSI), a second identifier for the device associated with WLAN access (e.g., NAI), and authentication information for the device. In at least one embodiment, the access accept message may be a RADIUS Access Accept message obtained from an authentication function (e.g., AAA 108). In at least one embodiment, the authentication information may include an authentication vector (e.g., {AUTN, RAND, XRES, KASME}) that may be used for authenticating the device for the cellular access.

In some embodiments, if the device is connected to another access or accesses (e.g., WLAN access) when the device latches on to the cellular access, the access accept message may additionally include context information for the device associated with the other access. In various embodiments, the context information may include any combination of an indication that the device is connected to the other access, an IP address for the device associated with the other access, an IP address for a function (e.g., WLC 104) handling a session for the device for the other access, and/or any other context information that may be associated with the other access. In at least one embodiment, if context information for another access is included in the access accept message, the function can update session information for the device with the context information included in the message, as shown at 410.

At 404, the method includes the function requesting policy information for the device from a policy function using the first identifier for the device associated with the cellular access or the second identifier for the device associated with the WLAN access. In at least one embodiment, the request may be generated and transmitted to the policy function via the S6a-SM interface. At 406, the function receives the policy information for the device and, at 408, the function updates session information for the device based on the received policy information. In various embodiments, the policy information may include APN and/or DNN information for the device, service quality information for the device (e.g., QoS, QCI, GBR, etc.), combinations thereof, and/or the like.

Although features of the embodiment of FIG. 4 are discussed with reference to the function associated with the cellular access, in some embodiments a function associated with the WLAN access (e.g., WLC 104, MATF 130, etc.) that is handling a session for a device for the WLAN access may also obtain an access accept message (e.g., from AAA 108) that includes context information for the cellular access if a device is connected to the cellular access at the time of connecting to the WLAN access. In such embodiments, the function associated the WLAN access can update session information for the device with the context information for the device associated with the cellular access (e.g., IP address of the CTF 102, IP address of the device for the cellular session, etc.).

Figure 5:
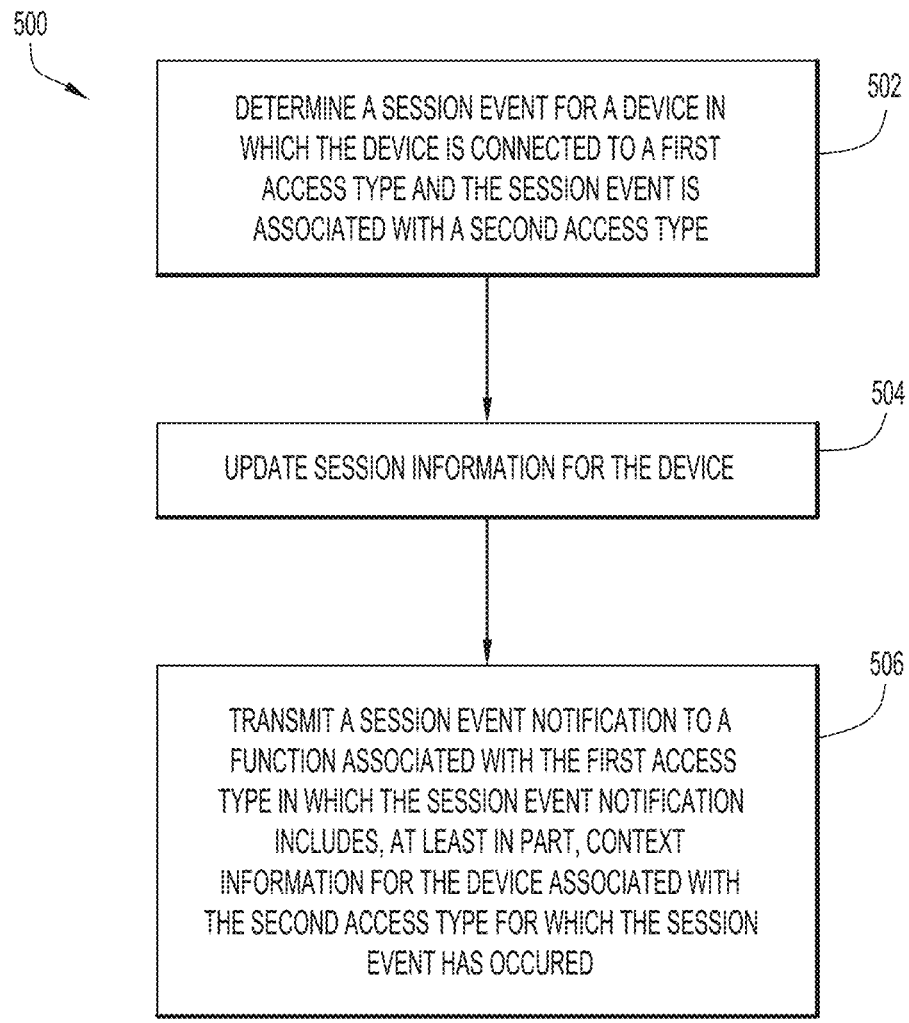
FIG. 5 is a flow chart depicting yet another method according to an example embodiment.

Referring to FIG. 5, FIG. 5 is flow chart depicting a method 500 according to an example embodiment. In at least one embodiment, method 500 may be associated with operations that may be performed by an authentication function (e.g., AAA 108) for session events that may occur for a device (e.g., device 120).

At 502, the method may include the authentication function determining a session event for the device in which the device is connected to a first access type and the session event is associated with a second access type (e.g., the device is connected to the WLAN access and determines a session event associated with the cellular access, or vice-versa). In various embodiments, the determining at 502 may be based on the authentication function receiving an Accounting Start/Stop message from a function associate with the first access type and identifying session information for the device maintained at the authentication function.

At 504, the method may include updating session information for the device maintained at the authentication function. At 506, the method may include the authentication function transmitting a session event notification to a function associated with the first access type (e.g., CTF 102 or WLC 104) in which the session event notification includes, at least in part, context information for the device associated with the second access type for which the session event has occurred. In at least one embodiment, the session event notification may be a RADIUS Change of Authorization (CoA) Request message. In at least one embodiment, the context information may include, at least in part, an indication of a session for the device being created or terminated for the second access type and an IP address for the device associated with the second access type. In at least one embodiment, the session event notification may further include a first identifier for the device associated with the first access type and a second identifier for the device associated with the second access type.

Figure 6:
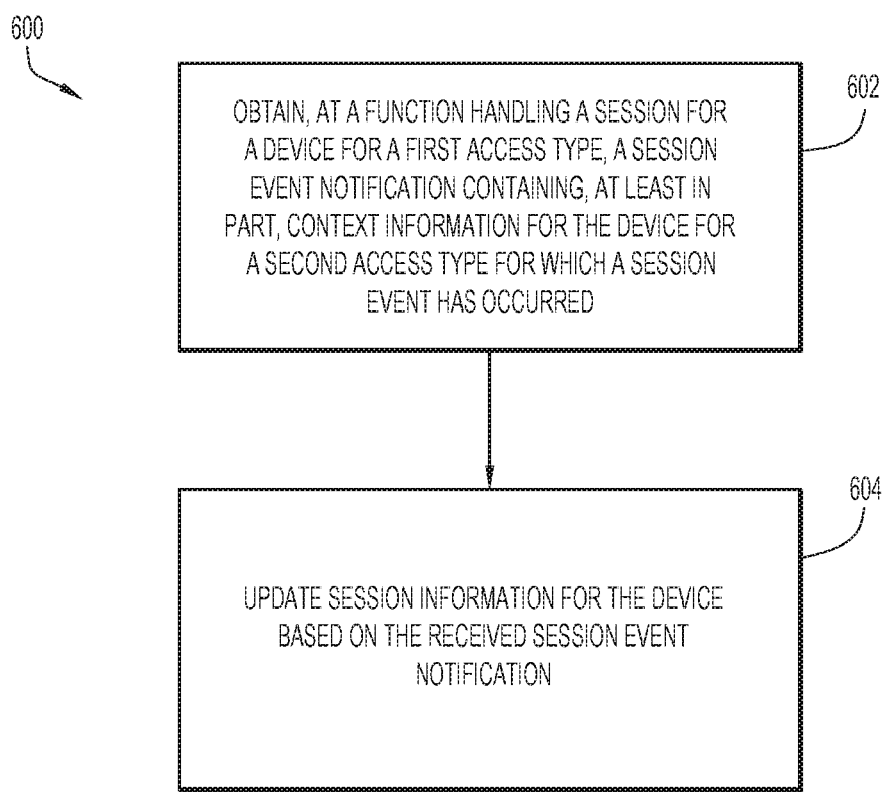
FIG. 6 is a flow chart depicting yet another method according to an example embodiment.

Referring to FIG. 6, FIG. 6 is flow chart depicting a method 600 according to an example embodiment. In at least one embodiment, method 600 may be associated with operations that may be performed by a function (e.g., CTF 102 or WLC 104) handling a session for a device (e.g., device 120) for an access type (e.g., cellular, WLAN, etc.).

At 602, the method may include receiving, at the function handling a session for the device for a first access type, a session event notification containing, at least in part, context information for the device for a second access type for which a session event has occurred. In at least one embodiment, the session event notification maybe a RADIUS CoA Request message received from an authentication function (e.g., AAA 108). In at least one embodiment, the context information may include, at least in part, an indication of a session for the device being created or terminated for the second access type and an IP address for the device associated with the second access type. In at least one embodiment, the session event notification may further include a first identifier for the device associated with the first access type and a second identifier for the device associated with the second access type. At 604, the method may include the function updating session information for the device based on the received session event notification.

Figure 7:
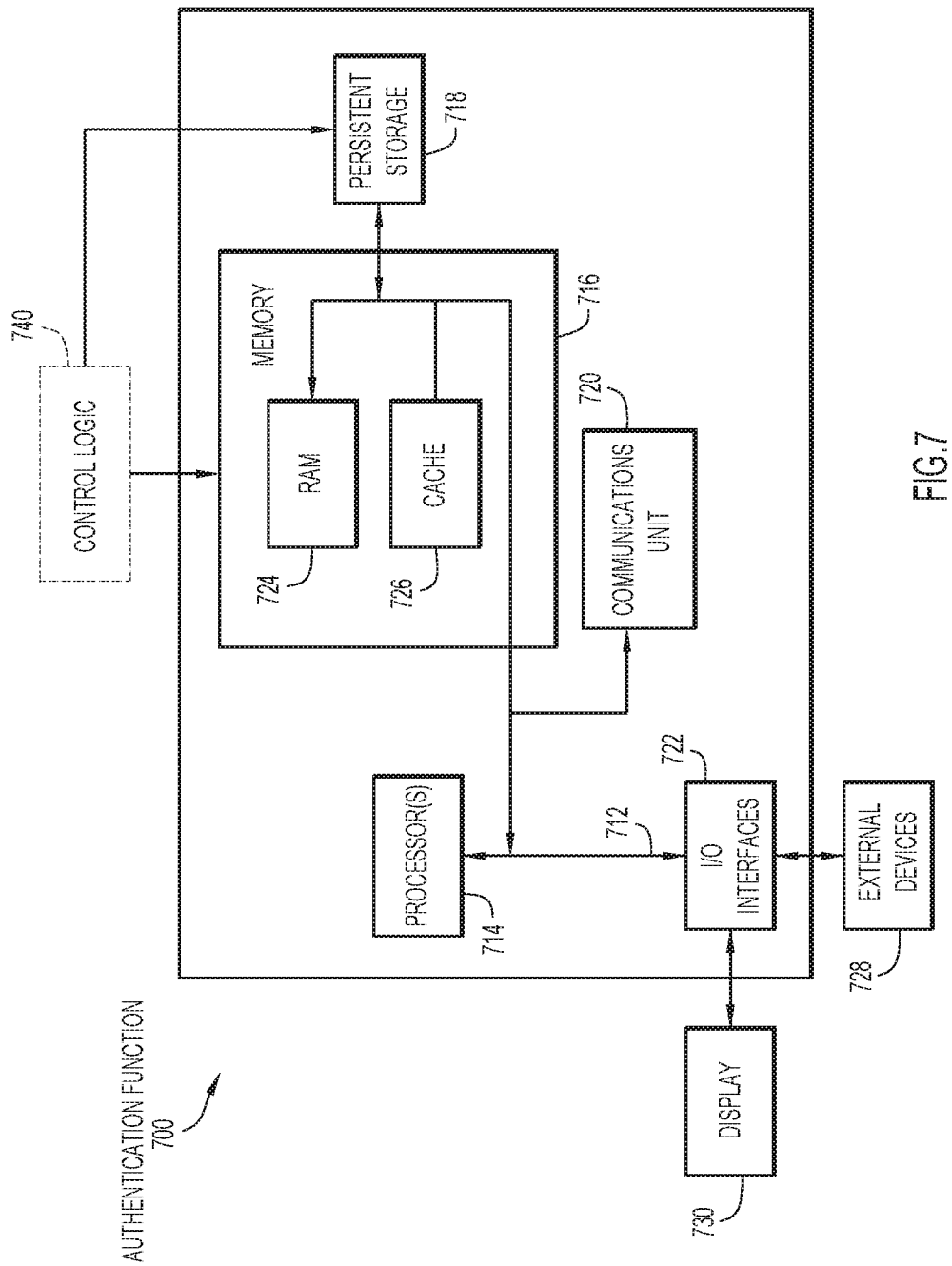
FIG. 7 is a hardware block diagram of an authentication function that may participate in authentication and subscription management operations according to an example embodiment.

Referring to FIG. 7, FIG. 7 is a hardware block diagram of an authentication function 700 that may participate in authentication and subscription management operations according to an example embodiment. In at least one embodiment, authentication function 700 may be representative of a configuration of AAA 108 discussed herein. It should be appreciated that FIG. 7 provides only an illustration of one embodiment and does not imply any limitations with regard to the environments in which different embodiments may be implemented. Many modifications to the depicted environment may be made.

As depicted, the authentication 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media, which can be inclusive on non-transitory computer readable storage media. In the depicted embodiment, memory 716, which may be inclusive of one or more memory element(s), may include random access memory (RAM) 724 and cache memory 726. In general, memory 716 can include any suitable volatile or non-volatile computer readable storage media. Instructions for control logic 740 may be stored in memory 716 and/or persistent storage 718 for execution by processor(s) 714. In at least one embodiment, control logic 740 may include EPS-AKA logic and/or any other authentication logic for generating an authentication vector for authenticating a device for a cellular access. When the processor(s) 714 execute control logic 740, the processor(s) 714 are caused to perform the operations described above in connection with FIGS. 1-6 (e.g., receiving RADIUS Access Request messages (via an S6a-Auth interface), mapping or otherwise linking per-access profiles for a converged access profile for a user/device for creating/maintaining/updating session information for the user/device for multiple accesses, generating and transmitting RADIUS Access Accept messages (via the S6a-Auth interface) and including corresponding authentication vector information, receiving RADIUS Accounting Start/Stop messages and sending session event notifications via CoA Request messages, combinations thereof, and/or the like as discussed herein).

One or more programs and/or other logic may be stored in persistent storage 718 for execution by one or more of the respective computer processors 714 via one or more memory elements of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices (e.g., via at least an S6a-Auth interface and/or any other interfaces). Communications unit 720 may provide communications through the use of either or both physical and wireless communications links.

I/O interface(s) 722 allows for input and output of data with other devices that may be connected to authentication function 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

Figure 8:
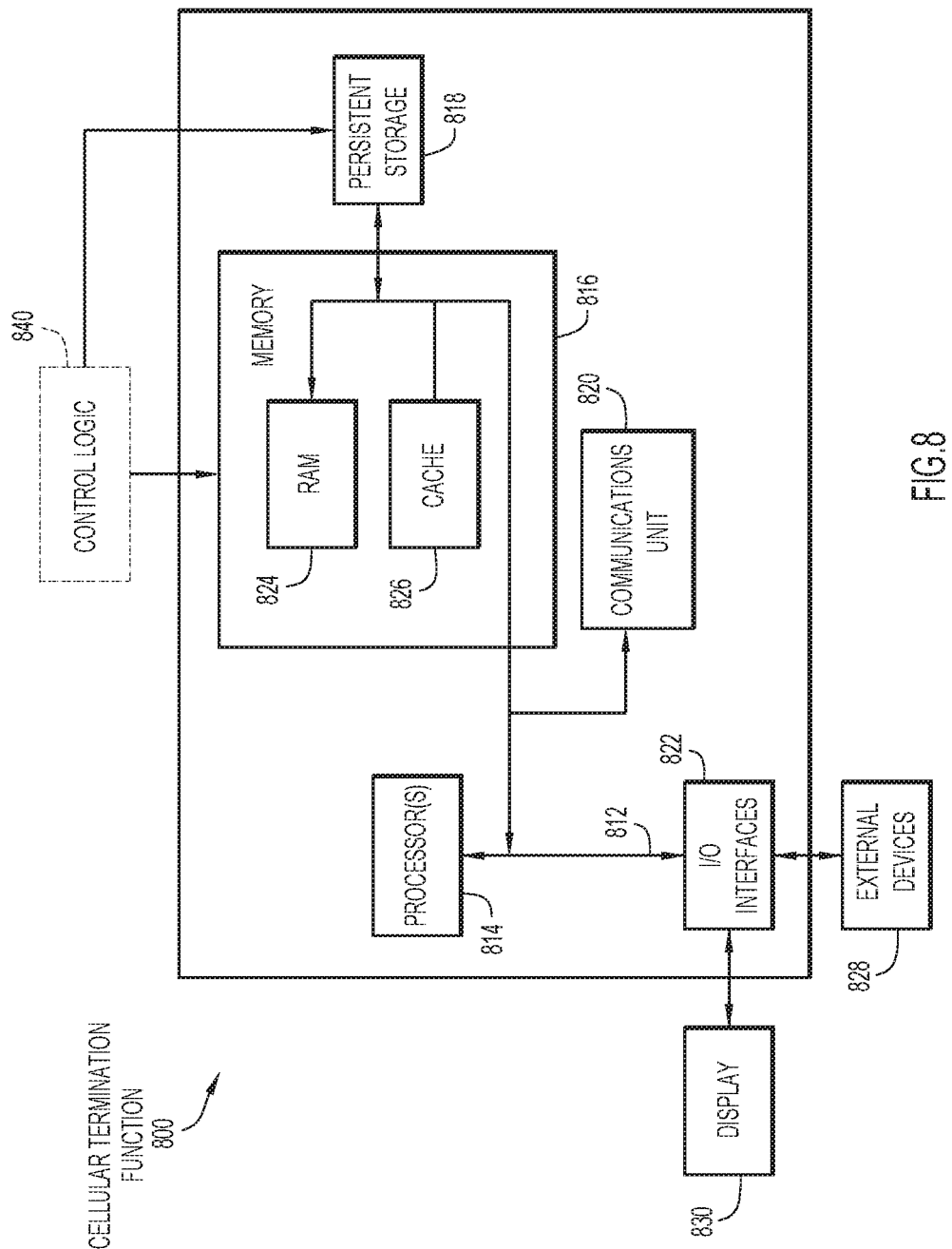
FIG. 8 is a hardware block diagram of a cellular termination function that may participate in authentication and subscription management operations according to an example embodiment.

Referring to FIG. 8, FIG. 8 is a hardware block diagram of a cellular termination function 800 that may participate in authentication and subscription management operations according to an example embodiment. In at least one embodiment, cellular termination function 800 may be representative of a configuration of CTF 102 discussed herein. It should be appreciated that FIG. 8 provides only an illustration of one embodiment and does not imply any limitations with regard to the environments in which different embodiments may be implemented. Many modifications to the depicted environment may be made.

As depicted, the cellular termination function 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media, which can be inclusive on non-transitory computer readable storage media. In the depicted embodiment, memory 816, which may be inclusive of one or more memory element(s), may include random access memory (RAM) 824 and cache memory 826. In general, memory 816 can include any suitable volatile or non-volatile computer readable storage media. Instructions for control logic 840 may be stored in memory 816 and/or persistent storage 818 for execution by processor(s) 814. When the processor(s) 814 execute control logic 840, the processor(s) 814 are caused to perform the operations described above in connection with FIGS. 1-6 (e.g., generating RADIUS Access Request messages (via an S6a-Auth interface) for a user/device that latches onto a cellular AP, creating/maintaining/updating session information for a user/device for a cellular access and/or other accesses to which the user/device may or may not be connected, receiving RADIUS Access Accept messages (via the S6a-Auth interface), performing authentication operations based on authentication vector information included in Access Accept messages, requesting and receiving policy information for a user/device (via the S6a-SM interface), determining session events for a user/device for a cellular access and transmitting RADIUS Accounting Start/Stop messages, receiving session event notifications via CoA Request messages, combinations thereof, and/or the like as discussed herein).

One or more programs and/or other logic may be stored in persistent storage 818 for execution by one or more of the respective computer processors 814 via one or more memory elements of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices (e.g., via at least an S6a-Auth interface, an S6a-SM interface and/or any other interfaces). Communications unit 820 may provide communications through the use of either or both physical and wireless communications links.

I/O interface(s) 822 allows for input and output of data with other devices that may be connected to cellular termination function 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

Referring to FIG. 9, FIG. 9 is a hardware block diagram of a wireless LAN controller 900 that may participate in authentication and subscription management operations according to an example embodiment. In at least one embodiment, wireless LAN controller 900 may be representative of a configuration of WLC 104 discussed herein. It should be appreciated that FIG. 9 provides only an illustration of one embodiment and does not imply any limitations with regard to the environments in which different embodiments may be implemented. Many modifications to the depicted environment may be made.

As depicted, the wireless LAN controller 900 includes a bus 912, which provides communications between computer processor(s) 914, memory 916, persistent storage 918, communications unit 920, and input/output (I/O) interface(s) 922. Bus 912 can be implemented with any architecture designed for passing data and/or control information between processors (such as microprocessors, communications and network processors, etc.), system memory, peripheral devices, and any other hardware components within a system. For example, bus 912 can be implemented with one or more buses.

Memory 916 and persistent storage 918 are computer readable storage media, which can be inclusive on non-transitory computer readable storage media. In the depicted embodiment, memory 916, which may be inclusive of one or more memory element(s), may include random access memory (RAM) 924 and cache memory 926. In general, memory 916 can include any suitable volatile or non-volatile computer readable storage media. Instructions for control logic 940 may be stored in memory 916 and/or persistent storage 918 for execution by processor(s) 914. When the processor(s) 914 execute control logic 940, the processor(s) 914 are caused to perform the operations described above in connection with FIGS. 1-6 (e.g., generating RADIUS Access Request messages for a user/device that latches onto a WLAN AP, creating/maintaining/updating session information for a user/device for a WLAN access and/or other accesses to which the user/device may or may not be connected, receiving RADIUS Access Accept messages, determining session events for a user/device for a cellular access and transmitting RADIUS Accounting Start/Stop messages, receiving session event notifications via CoA Request messages, combinations thereof, and/or the like as discussed herein).

One or more programs and/or other logic may be stored in persistent storage 918 for execution by one or more of the respective computer processors 914 via one or more memory elements of memory 916. The persistent storage 918 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 918 may also be removable. For example, a removable hard drive may be used for persistent storage 918. Other examples include optical and magnetic disks, thumb drives, and smart cards that are inserted into a drive for transfer onto another computer readable storage medium that is also part of persistent storage 918.

Communications unit 920, in these examples, provides for communications with other data processing systems or devices (e.g., via any appropriate interfaces). Communications unit 920 may provide communications through the use of either or both physical and wireless communications links.

I/O interface(s) 922 allows for input and output of data with other devices that may be connected to wireless LAN controller 900. For example, I/O interface 922 may provide a connection to external devices 928 such as a keyboard, keypad, a touch screen, and/or some other suitable input device. External devices 928 can also include portable computer readable storage media such as database systems, thumb drives, portable optical or magnetic disks, and memory cards.

Software and data used to practice embodiments can be stored on such portable computer readable storage media and can be loaded onto persistent storage 918 via I/O interface(s) 922. I/O interface(s) 922 may also connect to a display 930. Display 930 provides a mechanism to display data to a user and may be, for example, a computer monitor.

In various embodiments, any other element, function, node, etc. discussed for embodiments described herein (e.g., device 120, cellular AP 112, WLAN AP 114, NPF 106, user plane entities 116, etc.) may be configured with any combination of appropriate hardware (e.g., processor(s), memory element(s) etc.), software, logic, and/or the like similar to that as described for FIGS. 7-9. In addition, in some embodiments, air interface devices such as device 120, cellular AP 112, WLAN AP, and/or the like discussed herein may additionally and/or alternatively include any other hardware, software, logic, and/or the like (e.g., RF receivers, RF transmitters, RF transceivers, antennas and/or antenna arrays, baseband processors (modems), etc.) in order to perform operations as discussed for various embodiments described herein.

In summary, techniques presented herein provide for decoupling authentication and policy management functions from a 3GPP-HSS by splitting the 3GPP S6a interface into S6a-Auth (Authentication) and S6a-SM (Subscription Management) interfaces in which the S6a-Auth interface can be terminated into an authentication function (e.g., AAA, Cisco® ISE, etc.) and terminating the S6a-SM interface into a network policy function (e.g., an enterprise policy function, Cisco® DNAC:ACA, etc.). In addition, techniques presented herein provide for defining and implementing unified authentication and policy management interfaces across multiple access technologies including, but not limited to, WLAN (e.g., Wi-Fi), wired, and private cellular (e.g., Private LTE) access technologies.

Further, techniques presented herein may provide for creating a common user profile entry (e.g., a converged access profile) in the form of a single entry in an authentication function, or multiple entries but with some approach for linking the entries, for mapping the Wi-Fi/Wired access identity with Private LTE access identity.

Still further, techniques presented herein may provide for overloading the PAP authentication method with an operator-based EPS-AKA method for generating the authentication vector needed for a cellular termination function (e.g., CTF 102 to authenticate a device (e.g., device 120) for cellular access. Still further, techniques presented herein may provide for sending, for a first access type attachment, session indications (e.g., status flags, an indication of access (type)-attach=TRUE, context information, etc.) for a second access type in Access Response messages to a termination function associated with the first access type (e.g., CTF 102 or WLC 104).

Still further, techniques presented herein may provide for generating session event notifications via CoA messages to indicate a cellular session creation/termination events to WLC 104 and/or WLAN session creation/termination events to CTF 102. The notified event can include context information such as, but not limited to, a user's/device's access specific identifiers (e.g., IMSI, NAI) and IP address, IP address for a termination function handling the user's/device's session for another access type, etc. This may allow a termination function (e.g., CTF 102 or WLC 104) receiving such a session event notification correlate the user's/device's access sessions.

In at least one embodiment, techniques presented herein may advantageously allow an enterprise to eliminate the need for deploying a 3GPP-HSS for private cellular user authentication, and instead can use the existing authentication and policy management functions to facilitate authentication/policy management operations, independent of the radio access. Furthermore, with the use of a converged user/device profile in AAA 108 (with correlated RAT specific user/device identities/identifiers) an enterprise can advantageously correlate user/device sessions across multiple access sessions (e.g., private LTE, Wi-Fi, and wired) access sessions and enforce a common user/device policy.

In one form, a computer-implemented method is provided that may include providing a device profile at an authentication function, wherein the device profile comprises identification information for a device for a plurality of access types and the identification information comprises a first identifier for the device that is associated with a cellular access and a second identifier for the device that is associated with a wireless local area network access; obtaining an access request message associated with the device connecting to the cellular access, wherein the access request message comprises the first identifier for the device and an authentication attribute; generating authentication information for authenticating the device for the cellular access based, at least in part, on identifying the authentication attribute within the access request message; and generating, for transmission, an access accept message for the cellular access, wherein the access accept message comprises the first identifier for the device, the second identifier for the device, and the authentication information.

The access accept message may further include context information for the device that is associated with the wireless local area network access. The authentication attribute may be a password associated with a Password Authentication Protocol (PAP) authentication mechanism. In at least one implementation, generating the authentication information may include identifying the authentication attribute; identifying the first identifier for the device as being associated with the cellular access; and generating the authentication information using an Authentication and Key Agreement (AKA) mechanism, wherein the authentication information comprises an authentication vector for authenticating the device for the cellular access. The AKA mechanism may be an Evolved Packet System AKA (EPS-AKA) authentication mechanism. The first identifier may be an International Mobile Subscriber Identity (IMSI) that identifies the device for the cellular access. The second identifier may be a Network Access Identifier (NAI) that identifies the device for the wireless local area network access. The access accept message may be a Remote Authentication Dial-In User Service (RADIUS) access accept message that is transmitted to a function associated with the cellular access.

In at least one implementation, the method may further include requesting, by the function, policy information for the device from a policy function using the first identifier for the device that is associated with the cellular access or the second identifier for the device that is associated with a wireless local area network access, wherein the policy function and the authentication function are separate functions; obtaining, by the function, the policy information for the device from the policy function; and updating, by the function, session information for the device based on the policy information. The function may interface with the policy function using an S6a subscription management (S6a-SM) interface and the function may interface with the authentication function using an S6a authentication (S6a-Auth) interface.

In at least one implementation, the policy information may include at least one of: an access point name (APN); a data network name (DNN); and service quality information for the device. In at least one implementation, the may be function at least one of: a cellular termination function; a Mobility Management Entity; and an Access and Mobility Management Function. The function may be associated with any combination of a 3rd Generation Partnership Project (3GPP) 4th Generation (4G) access network, a 3GPP 5th Generation (5G) access network, a 3GPP next Generation (nG) access network, a 3GPP unlicensed spectrum access network, and a Citizen Broadband Radio Service (CBRS) access network.

In at least one implementation, the device profile may be configured as a combined device profile comprising: cellular profile information for the device that is associated with the cellular access, the cellular profile information comprising: the first identifier for the device that is associated with the cellular access; the second identifier for the device that is associated with the wireless local area network access; a password; a device key associated with the device; and an operator key associated with an operator of the cellular access; and wireless local area network profile information for the device that is associated with the wireless local area network access, the wireless local area network profile comprising: the first identifier for the device that is associated with the cellular access; the second identifier for the device that is associated with the wireless local area network access; and authentication type information associated with an authentication mechanism for the wireless local area network access.

In at least one implementation, device profile may be configured as separate per-access type device profiles configured for the device. The separate per-access type device profiles may include a cellular profile for the device a wireless local area network profile for the device. The cellular profile may include: the first identifier for the device that is associated with the cellular access; the second identifier for the device that is associated with the wireless local area network access; a password; a device key associated with the device; and an operator key associated with an operator of the cellular access. The wireless local area network profile may include: the first identifier for the device that is associated with the cellular access; the second identifier for the device that is associated with the wireless local area network access; and authentication type information associated with an authentication mechanism for the wireless local area network access.

In at least one implementation, the method may further include determining a session event for the device in which the device is connected to a first access type and the session event is associated with a second access type; and communicating a session event notification to a function associated the second access type for which the session event has occurred, wherein the session event notification comprises context information for the device associated with the second access type for which the session event has occurred. The session event notification may be a Remote Authentication Dial-In User Service (RADIUS) Change of Authorization message. For the Change of Authorization message, the function may be one of a cellular termination function or a wireless local area network controller. The context information may include one or more of: an indication of a session for the device being created or terminated for the second access type; and an Internet Protocol (IP) address for the device associated with the second access type. In at least one implementation, the session event notification may further include the first identifier for the device associated with the cellular access; and the second identifier for the device associated with the wireless local area network access.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. In general, packet is a formatted unit of data that can contain control or routing information (e.g., source and destination address, source and destination port, etc.) and a payload (e.g., data, signaling, instructions, and/or the like), which is also sometimes referred to as a data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to user/device converged access profiles, policy information, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), wireless LAN (WLAN), Wide Area Network (WAN), Ethernet network, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WLAN, WAN, Ethernet network, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, WLAN, hardwire, wireless link, Ethernet network, Intranet, etc.).

A system or computing device may employ any number of any conventional or other databases, data stores or storage structures (e.g., files, databases, data structures, data or other repositories, etc.) to store information (e.g., data relating to user/device converged access profiles, policy information, etc.). The database system may be implemented by any number of any conventional or other databases, data stores or storage structures (e.g., files, databases, data structures, data or other repositories, etc.) to store information (e.g., data relating to user/device converged access profiles, policy information, etc.). A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ and/or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, by an authentication function from a function of a cellular access, an access request message associated with authenticating a device for connecting the device to the cellular access, wherein the access request message comprises a first identifier for the device that is associated with the cellular access and a password associated with the cellular access;
    generating authentication information for authenticating the device for connecting the device to the cellular access based on identifying the first identifier for the device as being associated with the cellular access and identifying the password associated with the cellular access within the access request message, wherein the authentication information is generated using an using an Authentication and Key Agreement (AKA) mechanism and the authentication information comprises an authentication vector for authenticating the device for connecting to the cellular access; and generating, for transmission, an access accept message for connecting the device to the cellular access, wherein the access accept message comprises the first identifier for the device, a second identifier for the device associated with a wireless local area network access, and the authentication information.

2. The method of claim 1, wherein the access accept message further comprises context information for the device that is associated with the wireless local area network access.

3. The method of claim 1, wherein the first identifier is any stable identifier or permanent identifier for the device that is associated with the cellular access and the second identifier is any stable identifier or permanent identifier for the device that is associated with the wireless local area network access.

4. The method of claim 1, further comprising:
providing a device profile for the device, wherein the device profile comprises the first identifier for the device that is associated with the cellular access and the second identifier for the device that is associated with the wireless local area network access and wherein the device profile comprises one or more device profiles.

5. The method of claim 1, further comprising:
requesting policy information for the device from a policy function using the first identifier for the device that is associated with the cellular access or the second identifier for the device that is associated with the wireless local area network access;
obtaining the policy information for the device from the policy function; and
updating session information for the device based on the policy information.

6. The method of claim 1, wherein the cellular access is associated with at least one of a 3rd Generation Partnership Project (3GPP) 4th Generation (4G) access network, a 3GPP 5th Generation (5G) access network, a 3GPP next Generation (nG) access network, a 3GPP unlicensed spectrum access network, or a Citizen Broadband Radio Service (CBRS) access network.

7. The method of claim 1, wherein the password is not specific to a subscriber associated with the device.

8. The method of claim 1, further comprising:
transmitting the access accept message to the function of the cellular access for connecting the device to the cellular access.

9. One or more non-transitory computer readable storage media encoded with instructions that, when executed by a processor, cause the processor to perform operations, comprising:
obtaining, by an authentication function from a function of a cellular access, an access request message associated with authenticating a device for connecting the device to the cellular access, wherein the access request message comprises a first identifier for the device that is associated with the cellular access and a password associated with the cellular access;
generating authentication information for authenticating the device for connecting the device to the cellular access based on identifying the first identifier for the device as being associated with the cellular access and identifying the password associated with the cellular access within the access request message, wherein the authentication information is generated using an using an Authentication and Key Agreement (AKA) mechanism and the authentication information comprises an authentication vector for authenticating the device for connecting to the cellular access; and
generating, for transmission, an access accept message for connecting the device to the cellular access, wherein the access accept message comprises the first identifier for the device, a second identifier for the device associated with a wireless local area network access, and the authentication information.

10. The media of claim 9, wherein the access accept message further comprises context information for the device that is associated with the wireless local area network access.

11. The media of claim 9, wherein the first identifier is any stable identifier or permanent identifier for the device that is associated with the cellular access and the second identifier is any stable identifier or permanent identifier for the device that is associated with the wireless local area network access.

12. The media of claim 9, the operations further comprising:
providing a device profile for the device, wherein the device profile comprises the first identifier for the device that is associated with the cellular access and the second identifier for the device that is associated with the wireless local area network access and wherein the device profile comprises one or more device profiles.

13. The media of claim 9, the operations further comprising:
requesting policy information for the device from a policy function using the first identifier for the device that is associated with the cellular access or the second identifier for the device that is associated with the wireless local area network access;
obtaining the policy information for the device from the policy function; and
updating session information for the device based on the policy information.

14. A system comprising:
at least one memory element for storing data; and
at least one processor for executing instructions associated with the data, wherein executing the instructions causes the system to perform operations, comprising:
obtaining, by an authentication function from a function of a cellular access, an access request message associated with authenticating a device for connecting the device to the cellular access, wherein the access request message comprises a first identifier for the device that is associated with the cellular access and a password associated with the cellular access;
generating authentication information for authenticating the device for connecting the device to the cellular access based on identifying the first identifier for the device as being associated with the cellular access and identifying the password associated with the cellular access within the access request message, wherein the authentication information is generated using an using an Authentication and Key Agreement (AKA) mechanism and the authentication information comprises an authentication vector for authenticating the device for connecting to the cellular access; and generating, for transmission, an access accept message for connecting the device to the cellular access, wherein the access accept message comprises the first identifier for the device, a second identifier for the device associated with a wireless local area network access, and the authentication information.

15. The system of claim 14, wherein the access accept message further comprises context information for the device that is associated with the wireless local area network access.

16. The system of claim 14, wherein the first identifier is any stable identifier or permanent identifier for the device that is associated with the cellular access and the second identifier is any stable identifier or permanent identifier for the device that is associated with the wireless local area network access.

17. The system of claim 14, the operations further comprising:
providing a device profile for the device, wherein the device profile comprises the first identifier for the device that is associated with the cellular access and the second identifier for the device that is associated with the wireless local area network access and wherein the device profile comprises one or more device profiles.

18. The system of claim 14, the operations further comprising:
requesting policy information for the device from a policy function using the first identifier for the device that is associated with the cellular access or the second identifier for the device that is associated with the wireless local area network access;
obtaining the policy information for the device from the policy function; and
updating session information for the device based on the policy information.

19. The system of claim 14, wherein the cellular access is associated with at least one of a 3rd Generation Partnership Project (3GPP) 4th Generation (4G) access network, a 3GPP 5th Generation (5G) access network, a 3GPP next Generation (nG) access network, a 3GPP unlicensed spectrum access network, or a Citizen Broadband Radio Service (CBRS) access network.

20. The system of claim 14, further comprising:
transmitting the access accept message to the function of the cellular access for connecting the device to the cellular access.

* * * * *